United States Patent
Yamamoto et al.

(10) Patent No.: US 11,159,706 B2
(45) Date of Patent: Oct. 26, 2021

(54) CAMERA MODULE MANUFACTURING APPARATUS AND CAMERA MODULE MANUFACTURING METHOD

(71) Applicants: PFA Corporation, Saitama (JP); TECHNO HORIZON CO., LTD., Aichi (JP); SHINKAWA LTD., Tokyo (JP)

(72) Inventors: Tsukasa Yamamoto, Saitama (JP); Fujio Asano, Saitama (JP); Hideho Miyake, Saitama (JP); Koji Imagawa, Saitama (JP); Hiroki Takagaki, Nagano (JP); Shingo Natori, Nagano (JP)

(73) Assignees: PFA Corporation, Saitama (JP); TECHNO HORIZON CO., LTD., Aichi (JP); SHINKAWA LTD., Tokyo (JP)

(*) Notice: Subject to any disclaimer, the term of this patent is extended or adjusted under 35 U.S.C. 154(b) by 0 days.

(21) Appl. No.: 16/975,394

(22) PCT Filed: Mar. 19, 2019

(86) PCT No.: PCT/JP2019/011523
§ 371 (c)(1),
(2) Date: Aug. 25, 2020

(87) PCT Pub. No.: WO2020/188761
PCT Pub. Date: Sep. 24, 2020

(65) Prior Publication Data
US 2021/0218870 A1 Jul. 15, 2021

(51) Int. Cl.
*H04N 5/225* (2006.01)
*H04N 5/232* (2006.01)
*G02B 7/04* (2021.01)

(52) U.S. Cl.
CPC ............. *H04N 5/2254* (2013.01); *G02B 7/04* (2013.01); *H04N 5/2253* (2013.01); *H04N 5/23287* (2013.01)

(58) Field of Classification Search
CPC ............. H04N 5/2254; H04N 5/23287; H04N 5/2253; G02B 7/04
See application file for complete search history.

(56) References Cited

U.S. PATENT DOCUMENTS 5,805,218 A 9/1998 Ohura et al.
5,909,027 A 6/1999 Ohura et al.
(Continued)

FOREIGN PATENT DOCUMENTS

CN 108581869 9/2018
JP 2899553 6/1999
(Continued)

OTHER PUBLICATIONS

"Office Action of Taiwan Counterpart Application", dated Sep. 21, 2020, with English translation thereof, p. 1-p. 19.
(Continued)

*Primary Examiner* — Chiawei Chen
(74) *Attorney, Agent, or Firm* — JCIPRNET

(57) ABSTRACT

There is disclosed a camera module manufacturing apparatus for joining together a lens unit that incorporates a taking lens and a sensor board to which an image sensor is attached. The camera module manufacturing apparatus includes an optical unit including a collimator lens and a measurement chart for forming an image of the measurement chart on the image sensor through the taking lens. The relative position of the lens unit and the sensor board is adjusted based on an image signal obtained by converting, using the image sensor, an image of the measurement chart that is formed on the image sensor by the optical unit. The measurement chart is (Continued)

disposed to be tilted with respect to a plane that is perpendicular to an optical axis of the collimator lens.

17 Claims, 18 Drawing Sheets

(56) References Cited

U.S. PATENT DOCUMENTS

| | | | |
|---|---|---|---|
| 6,590,670 B1 | 7/2003 | Kato et al. | |
| 10,187,636 B2* | 1/2019 | Wong | H04N 5/2354 |
| 10,408,607 B2* | 9/2019 | Kim | G01B 11/26 |
| 2008/0055696 A1* | 3/2008 | Wen | G02B 7/365 |
| | | | 359/237 |
| 2009/0180021 A1* | 7/2009 | Kikuchi | H04N 5/2257 |
| | | | 348/349 |
| 2012/0177268 A1* | 7/2012 | Malmin | G06T 11/005 |
| | | | 382/131 |
| 2013/0047396 A1* | 2/2013 | Au | B23Q 17/22 |
| | | | 29/407.09 |
| 2015/0174715 A1* | 6/2015 | Kang | G03B 43/00 |
| | | | 29/407.04 |
| 2015/0192750 A1 | 7/2015 | Shiraishi | |
| 2016/0014313 A1* | 1/2016 | Muller | H04N 5/2253 |
| | | | 348/294 |
| 2016/0061594 A1* | 3/2016 | Kim | G01M 11/0264 |
| | | | 348/302 |
| 2016/0150140 A1* | 5/2016 | Fujinami | H04N 17/002 |
| | | | 29/825 |
| 2016/0323485 A1 | 11/2016 | Shimizu et al. | |
| 2016/0323486 A1* | 11/2016 | Takase | H04N 5/2253 |
| 2016/0323511 A1* | 11/2016 | Takase | H04N 5/2254 |
| 2016/0341974 A1* | 11/2016 | Kishine | G02B 7/08 |
| 2017/0048518 A1 | 2/2017 | Jiang et al. | |
| 2017/0201744 A1* | 7/2017 | Wong | H04N 5/2257 |
| 2017/0371113 A1 | 12/2017 | Shimono et al. | |
| 2018/0184005 A1* | 6/2018 | Morotomi | H04N 5/23258 |
| 2020/0329181 A1* | 10/2020 | Lee | H04N 17/002 |

FOREIGN PATENT DOCUMENTS

| | | |
|---|---|---|
| JP | 2000346746 | 12/2000 |
| JP | 2005241621 | 9/2005 |
| JP | 2008041166 | 2/2008 |
| JP | 4860378 | 1/2012 |
| JP | 2012058139 | 3/2012 |
| JP | 2012093116 | 5/2012 |
| JP | 4960308 | 6/2012 |
| JP | 5322722 | 10/2013 |
| JP | 5460406 | 4/2014 |
| JP | 2014190776 | 10/2014 |
| JP | 2016092761 | 5/2016 |
| JP | 2016526182 | 9/2016 |
| KR | 20160117336 | 10/2016 |

OTHER PUBLICATIONS

Office Action of Korea Counterpart Application, with English translation thereof, dated May 20, 2021, pp. 1-10.
Office Action of China Counterpart Application, with English translation thereof, dated Jun. 22, 2021, pp. 1-17.

* cited by examiner

CAMERA MODULE MANUFACTURING APPARATUS AND CAMERA MODULE MANUFACTURING METHOD

CROSS-REFERENCE TO RELATED APPLICATION

This application is a 371 application of the international PCT application serial no. PCT/JP2019/011523, filed on Mar. 19, 2019. The entirety of the abovementioned patent application is hereby incorporated by reference herein and made a part of this specification.

TECHNICAL FIELD

The present invention relates to a camera module manufacturing apparatus and a camera module manufacturing method for manufacturing a camera module by joining together a lens unit and a sensor board to which an image sensor is attached.

BACKGROUND

There are known camera modules in which a lens unit that incorporates a taking lens and a sensor board to which an image sensor such as a CCD or CMOS is attached are integrated into a single module. Such a camera module is manufactured by adjusting the position of the sensor board relative to the lens unit so that an image capture plane of the image sensor substantially matches with an image formation plane of the lens unit, and, after the position adjustment has been accomplished, joining the sensor board to the lens unit with an ultraviolet curing resin (see, for example, Patent Document 1 and Patent Document 2).

CITATION LIST

Patent Literature

Patent Document 1: JP 5460406 B
Patent Document 2: JP 4960308 B

SUMMARY

Technical Problem

Conventional camera module manufacturing apparatuses as disclosed in Patent Document 1 and Patent Document 2 capture images of a measurement chart while changing the position of the sensor board with respect to the lens unit, detect changes in a focus assessment value of the images with respect to the position of the sensor board, and adjust the position of the sensor board in accordance with the changes in the focus assessment value. As such, these apparatuses have a drawback in that the position adjustment is time consuming because it is necessary to obtain images of the measurement chart with the sensor board being at many different positions.

To address this issue, the present invention provides a camera module manufacturing apparatus that is directed toward quickly adjusting the relative position of the lens unit and the sensor board and increasing productivity.

Solution to Problem

According to an aspect of the present invention, there is provided a camera module manufacturing apparatus for manufacturing a camera module by adjusting a relative position of a lens unit that incorporates a taking lens and a sensor board to which an image sensor configured to convert an image that is formed by the taking lens into an image signal is attached, and for joining together the lens unit and the sensor board with the relative position having been adjusted, the camera module manufacturing apparatus comprising an optical unit including a collimator lens and a measurement chart for forming an image of the measurement chart on the image sensor through the collimator lens and the taking lens, wherein the relative position of the lens unit and the sensor board is adjusted based on an image signal obtained by converting, using the image sensor, an image of the measurement chart that is formed on the image sensor by the optical unit, and wherein the measurement chart is disposed to be tilted with respect to a plane that is perpendicular to an optical axis of the collimator lens.

As described above, as the measurement chart is disposed to be tilted with respect to a plane that is perpendicular to the optical axis of the collimator lens, the height of the image formation plane upon which an image of the measurement chart is formed by the taking lens varies with respect to the distance from the optical axis of the taking lens in an orthogonal direction to the optical axis. Therefore, a plurality of images of the measurement chart for which the image formation plane of the taking lens varies in height can be obtained in a single image capture, and the relative position of the lens unit and the sensor board can be adjusted by obtaining, in a single image capture, spatial frequency response or other focus assessment value change characteristics with respect to the height deviation between the image formation plane of the taking lens and the image capture plane of the image sensor. With this configuration, the relative position of the lens unit and the sensor board can be adjusted quickly, and productivity can be increased.

According to another aspect of the present invention, the camera module manufacturing apparatus may include a sensor board holder configured to hold the sensor board; a lens unit holder configured to hold the lens unit, the lens unit holder being disposed toward a first side with respect to the sensor board holder; a movement mechanism configured to move one of the lens unit holder and the sensor board holder relative to the other or both relative to each other; and a controller configured to adjust the relative position of the lens unit and the sensor board using the movement mechanism. The optical unit may be disposed toward the first side with respect to the lens unit holder. The lens unit holder may hold the lens unit at a position where a position of a focal point of the collimator lens of the optical unit coincides with a position in an entrance pupil of the taking lens of the lens unit. The collimator lens may cause an image of the measurement chart to be formed through the entrance pupil of the taking lens on the image sensor of the sensor board that is held by the sensor board holder.

As described above, as the lens unit is held at a position where the position of the focal point of the collimator lens of the optical unit coincides with a position in the entrance pupil of the taking lens of the lens unit, the collimator lens and the taking lens constitute a measurement chart side telecentric optical system. The collimator lens causes an image of the measurement chart to be formed through the entrance pupil of the taking lens on the image sensor. As such, while the measurement chart is disposed to be tilted with respect to a plane that is perpendicular to the optical axis of the collimator lens so that the distance between the collimator lens and the measurement chart in the optical axis direction varies according to the distance from the optical axis of the collimator lens in an orthogonal direction to the optical axis, the size of the image of the measurement chart that is formed on the image capture plane of the image sensor can remain unchanged. Therefore, as error factors are reduced, accuracy can be improved, and spatial frequency response or another focus assessment value can be calculated accurately. With this configuration, the relative position of the lens unit and the sensor board can be adjusted quickly with improved adjustment accuracy, and productivity can be increased.

According to still another aspect of the present invention, the optical unit of the camera module manufacturing apparatus may include a central optical system including a central collimator lens and a central measurement chart for forming an image of the central measurement chart in a central portion of the image sensor through the central collimator lens and the taking lens; and at least two peripheral optical systems each including a peripheral collimator lens and a peripheral measurement chart for respectively forming images of the peripheral measurement charts in peripheral portions of the image sensor through the peripheral collimator lenses and the taking lens. The relative position of the lens unit and the sensor board may be adjusted based on a central image signal obtained by converting, using the image sensor, an image of the central measurement chart that is formed in the central portion of the image sensor by the central optical system and peripheral image signals obtained by converting, using the image sensor, images of the peripheral measurement charts that are respectively formed in the peripheral portions of the image sensor by the peripheral optical systems. The central measurement chart may be disposed to be tilted with respect to a plane that is perpendicular to an optical axis of the central collimator lens. Each of the peripheral measurement charts may be disposed to be tilted with respect to a plane that is perpendicular to an optical axis of a corresponding one of the peripheral collimator lenses.

As described above, the central collimator lens and the taking lens cause an image of the central measurement chart to be formed in the central portion of the image capture plane of the image sensor, and the peripheral collimator lenses and the taking lens cause images of the peripheral measurement charts to be formed in the peripheral portions of the image capture plane of the image sensor. As such, a plurality of images of the measurement charts for which the image formation plane of the taking lens varies in height can be obtained in the central portion and the plurality of peripheral portions of the image sensor in a single image capture, and spatial frequency response or other focus assessment value change characteristics with respect to the height deviation between the image formation plane of the taking lens and the image capture plane of the image sensor can be obtained in the central portion and the plurality of peripheral portions of the image sensor in a single image capture. Also, the adjustment of the lens unit and the sensor board in the height direction and in the tilt direction can be performed simultaneously based on the obtained spatial frequency response or other focus assessment value change characteristics, the relative position of the lens unit and the sensor board can be adjusted more quickly, and productivity can be further increased.

According to still another aspect of the present invention, the camera module manufacturing apparatus may include a sensor board holder configured to hold the sensor board; a lens unit holder configured to hold the lens unit, the lens unit holder being disposed toward a first side with respect to the sensor board holder; a movement mechanism configured to move one of the lens unit holder and the sensor board holder relative to the other or both relative to each other; and a controller configured to adjust the relative position of the lens unit and the sensor board using the movement mechanism. The optical unit may be disposed toward the first side with respect to the lens unit holder. The peripheral collimator lenses may be disposed to have the optical axes to be tilted with respect to the optical axis of the central collimator lens and such that positions of focal points of the peripheral collimator lenses and a position of a focal point of the central collimator lens are located at an identical position. The lens unit holder may hold the lens unit at a position where the position of the focal point of the central collimator lens and the positions of the focal points of the peripheral collimator lenses coincide with a position in an entrance pupil of the taking lens. The central collimator lens of the central optical system may cause an image of the central measurement chart to be formed through the entrance pupil of the taking lens in the central portion of the image sensor. The peripheral collimator lenses of the peripheral optical systems may cause images of the peripheral measurement charts to be respectively formed through the entrance pupil of the taking lens in the peripheral portions of the image sensor. Also, the lens unit holder of the camera module manufacturing apparatus may hold the lens unit at a position where the taking lens has an optical axis that is coaxial with the optical axis of the central collimator lens, and where a center position of the entrance pupil of the taking lens coincides with the position of the focal point of the central collimator lens and the positions of the focal points of the peripheral collimator lenses.

As described above, as the lens unit is held at a position where the position of the focal point of the central collimator lens and the positions of the focal points of the peripheral collimator lenses coincide with a position in the entrance pupil of the taking lens, the central collimator lens and the taking lens constitute a central measurement chart side telecentric optical system, and each of the peripheral collimator lenses and the taking lens constitute a peripheral measurement chart side telecentric optical system. Further, the central collimator lens causes an image of the central measurement chart to be formed through the entrance pupil of the taking lens on the image capture plane of the image sensor. As such, while the central measurement chart is disposed to be tilted with respect to a plane that is perpendicular to the optical axis of the central collimator lens so that the distance between the central collimator lens and the central measurement chart in the optical axis direction varies according to the distance from the optical axis of the central collimator lens in an orthogonal direction to the optical axis, the size of the image of the central measurement chart that is formed on the image capture plane of the image sensor can remain unchanged. Similarly, the peripheral collimator lenses cause images of the peripheral measurement charts to be formed through the entrance pupil of the taking lens on the image capture plane of the image sensor. As such, while the peripheral measurement charts are each disposed to be tilted with respect to a plane that is perpendicular to the optical axis of a corresponding one of the peripheral collimator lenses so that the distance between the peripheral collimator lens and the peripheral measurement chart in the optical axis direction varies according to the distance from the optical axis of the peripheral collimator lens in an orthogonal direction to the optical axis, the size of the images of the peripheral measurement charts that are formed on the image capture plane of the image sensor can remain unchanged. Therefore, as error factors are reduced, accuracy can be improved, and spatial frequency response or another focus assessment value can be calculated accurately. With this configuration, the relative position of the lens unit and the sensor board can be adjusted more quickly with improved adjustment accuracy, and productivity can be further increased.

According to still another aspect of the present invention, the optical unit of the camera module manufacturing apparatus may include a base that has a flat shape. The central collimator lens may be attached toward a second side with respect to a central portion of the base to have the optical axis to be perpendicular to a surface of the base. The peripheral collimator lenses may be attached toward the second side with respect to peripheral portions of the base to have the optical axes to be tilted with respect to the surface of the base and such that the positions of the focal points of the peripheral collimator lenses and the position of the focal point of the central collimator lens are located at an identical position.

As described above, as the central collimator lens and the peripheral collimator lenses are attached to the same base such that the position of the focal point of the central collimator lens and the positions of the focal points of the peripheral collimator lenses are located at an identical position, the optical unit can be made compact.

According to still another aspect of the present invention, in the camera module manufacturing apparatus, the central measurement chart may be disposed toward the first side with respect to the central portion of the base to be tilted with respect to the surface of the base, and each of the peripheral measurement charts may be attached to a corresponding one of the peripheral portions of the base to be parallel with the surface of the base.

With this configuration, the optical unit can have a simple structure.

According to still another aspect of the present invention, in the camera module manufacturing apparatus, the central measurement chart may have a center edge that passes through the optical axis of the central collimator lens and extends in a tilt direction, and each of the peripheral measurement charts may have a first edge that passes through the optical axis of a corresponding one of the peripheral collimator lenses and extends in a direction from the central portion of the base toward a corresponding one of the peripheral portions of the base and a second edge that extends in a direction that intersects the first edge.

With this configuration, spatial frequency response or other focus assessment value change characteristics with respect to the height deviation between the image formation plane of the taking lens and the image capture plane of the image sensor can be obtained accurately in the central portion and the plurality of peripheral portions of the image sensor in a single image capture, the relative position of the lens unit and the sensor board can be adjusted more quickly, and productivity can be further increased.

According to still another aspect of the present invention, the camera module manufacturing apparatus may include a cover attached toward the first side with respect to the base for covering the first side of the base; and a light source attached toward the first side with respect to the base. Each of the central measurement chart and the peripheral measurement charts may be composed of a light transmitting portion that transmits light and a light shielding portion that blocks light. An inner surface of the cover may reflect light coming from the light source and may cause the light to be incident upon the central measurement chart and the peripheral measurement charts. Also, the light source may be shaped like a ring and may be disposed to have a central axis that is coaxial with the optical axis of the central collimator lens.

With this configuration, the optical unit can be made compact, the central measurement chart and the peripheral measurement charts can be illuminated evenly, and good images of the measurement charts can be formed on the image capture plane of the image sensor.

According to still another aspect of the present invention, there is provided a camera module manufacturing method for manufacturing a camera module by adjusting a relative position of a lens unit that incorporates a taking lens and a sensor board to which an image sensor configured to convert an image that is formed by the taking lens into an image signal is attached, and for joining together the lens unit and the sensor board with the relative position having been adjusted, the camera module manufacturing method comprising a preparation step of preparing an optical unit including a collimator lens and a measurement chart; and a position adjustment step of forming, using the optical unit, an image of the measurement chart on the image sensor through the collimator lens and the taking lens, and adjusting the relative position of the lens unit and the sensor board based on an image signal obtained by converting, using the image sensor, the image of the measurement chart that is formed on the image sensor, wherein the position adjustment step is performed with the measurement chart being disposed to be tilted with respect to a plane that is perpendicular to an optical axis of the collimator lens.

As described above, as the measurement chart is tilted with respect to a plane that is perpendicular to the optical axis of the collimator lens, the height of the image formation plane upon which an image of the measurement chart is formed by the taking lens can be varied with respect to the distance from the optical axis of the taking lens in an orthogonal direction to the optical axis. Therefore, a plurality of images of the measurement chart for which the image formation plane of the taking lens varies in height can be obtained in a single image capture, and the position of the lens unit and the sensor board can be adjusted by obtaining, in a single image capture, spatial frequency response or other focus assessment value change characteristics with respect to the height deviation between the image formation plane of the taking lens and the image capture plane of the image sensor. With this configuration, the relative position of the lens unit and the sensor board can be adjusted quickly, and productivity can be increased.

According to still another aspect of the present invention, in the camera module manufacturing method, the optical unit may include a central optical system including a central collimator lens and a central measurement chart for forming an image of the central measurement chart in a central portion of the image sensor through the central collimator lens and the taking lens; and at least two peripheral optical systems each including a peripheral collimator lens and a peripheral measurement chart for respectively forming images of the peripheral measurement charts in peripheral portions of the image sensor through the peripheral collimator lenses and the taking lens. The position adjustment step may include adjusting the relative position of the lens unit and the sensor board based on a central image signal obtained by converting, using the image sensor, an image of the central measurement chart that is formed in the central portion of the image sensor by the central optical system and peripheral image signals obtained by converting, using the image sensor, images of the peripheral measurement charts that are respectively formed in the peripheral portions of the image sensor by the peripheral optical systems. The position adjustment step may be performed with the central measurement chart being disposed to be tilted with respect to a plane that is perpendicular to an optical axis of the central collimator lens, and with the peripheral measurement charts being each disposed to be tilted with respect to a plane that is perpendicular to an optical axis of a corresponding one of the peripheral collimator lenses.

As described above, the position adjustment step is performed by forming an image of the central measurement chart in the central portion of the image sensor through the central collimator lens and the taking lens, and forming images of the peripheral measurement charts in the peripheral portions of the image sensor through the plurality of peripheral collimator lenses and the taking lens. As such, a plurality of images of the measurement charts for which the image formation plane of the taking lens varies in height can be obtained in the central portion and the plurality of peripheral portions of the image sensor in a single image capture, and spatial frequency response or other focus assessment value change characteristics with respect to the height deviation between the image formation plane of the taking lens and the image capture plane of the image sensor can be obtained in the central portion and the plurality of peripheral portions of the image sensor in a single image capture. Also, the adjustment of the lens unit and the sensor board in the height direction and in the tilt direction can be performed simultaneously based on the obtained spatial frequency response or other focus assessment value change characteristics, the relative position of the lens unit and the sensor board can be adjusted more quickly, and productivity can be further increased.

Advantageous Effects of Invention

The camera module manufacturing apparatus according to the present invention enables quick adjustment of the relative position of the lens unit and the sensor board and increasing productivity.

DESCRIPTION OF EMBODIMENTS

A camera module manufacturing apparatus 100 according to an embodiment will be described below with reference to the drawings. Referring first to FIGS. 1 to 6, a structure of the camera module manufacturing apparatus 100 will be described.

Figure 1:
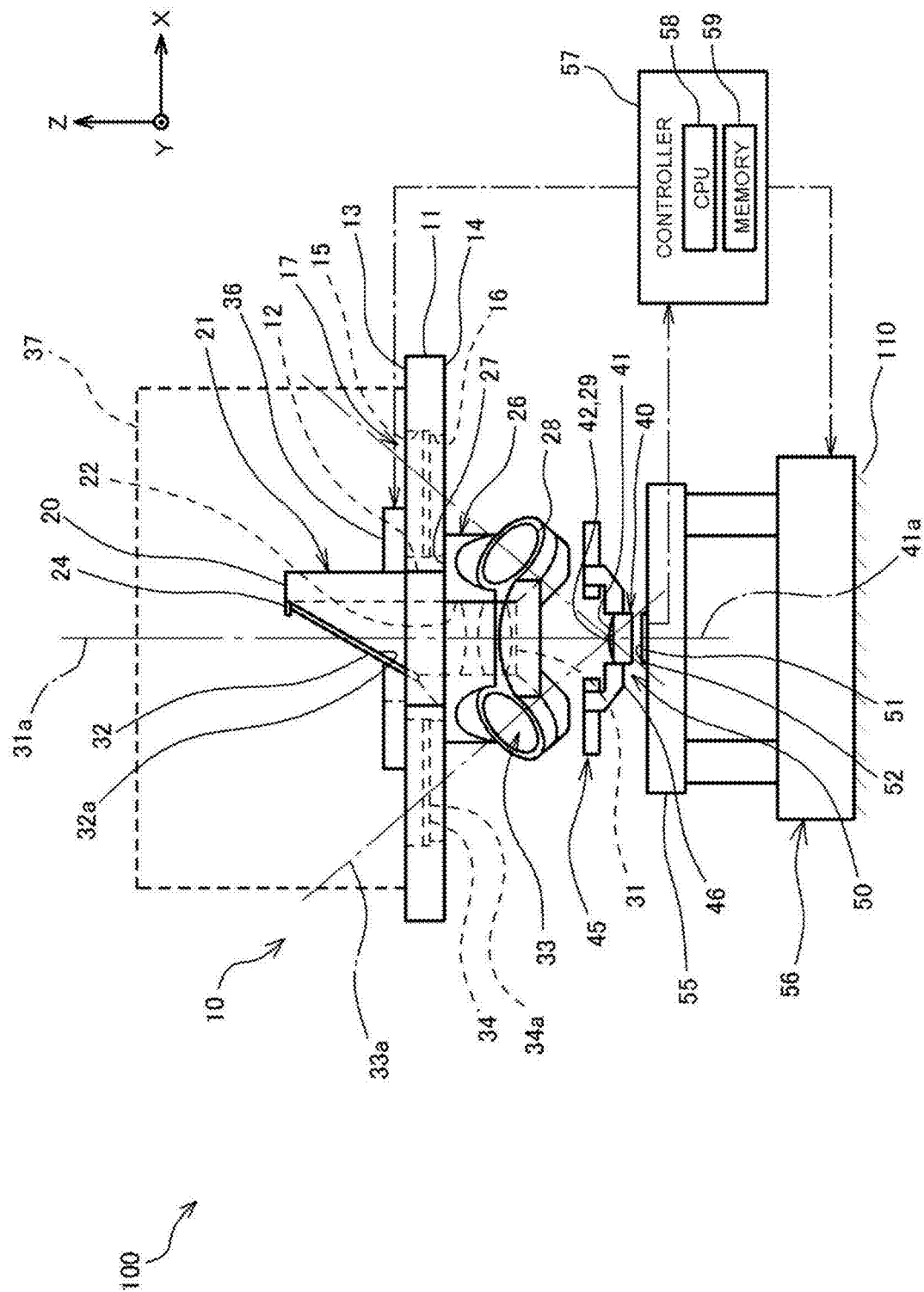
FIG. 1 is a side view of a camera module manufacturing apparatus according to an embodiment.

As illustrated in FIG. 1, the camera module manufacturing apparatus 100 is configured to manufacture a camera module 50 by joining together a lens unit 40 that incorporates a taking lens 41, and a sensor board 51 to which an image sensor 52 is attached. The camera module manufacturing apparatus 100 includes an optical unit 10, a robot arm 45 that holds the lens unit 40, a stage 55 that holds the sensor board 51 on its top surface, a six-degree-of-freedom actuator 56 that moves the position of the stage 55 with respect to six degrees of freedom, and a controller 57 that controls the six-degree-of-freedom actuator 56. In this embodiment, the robot arm 45 serves as the lens unit holder, the stage 55 serves as a sensor board holder, and the six-degree-of-freedom actuator 56 serves as a movement mechanism. In the following description, the tilt direction toward which a central measurement chart 32 of the optical unit 10 is tilted is referred to as an x direction, the direction that is orthogonal to the x direction in a horizontal plane is referred to as a y direction, and the vertical direction is referred to as the z direction. The positive (+) side in the z direction is the upper side, and the negative (−) side in the z direction is the lower side. The upper side (above) corresponds to a first side, and the lower side (below) corresponds to a second side.

The optical unit 10 includes a base 11, a center unit 20 that is attached to the base 11, a light source 36 that is shaped like a ring and attached to a top surface 13 of the base 11, and a cover 37 that is attached over the base 11.

Figure 2:
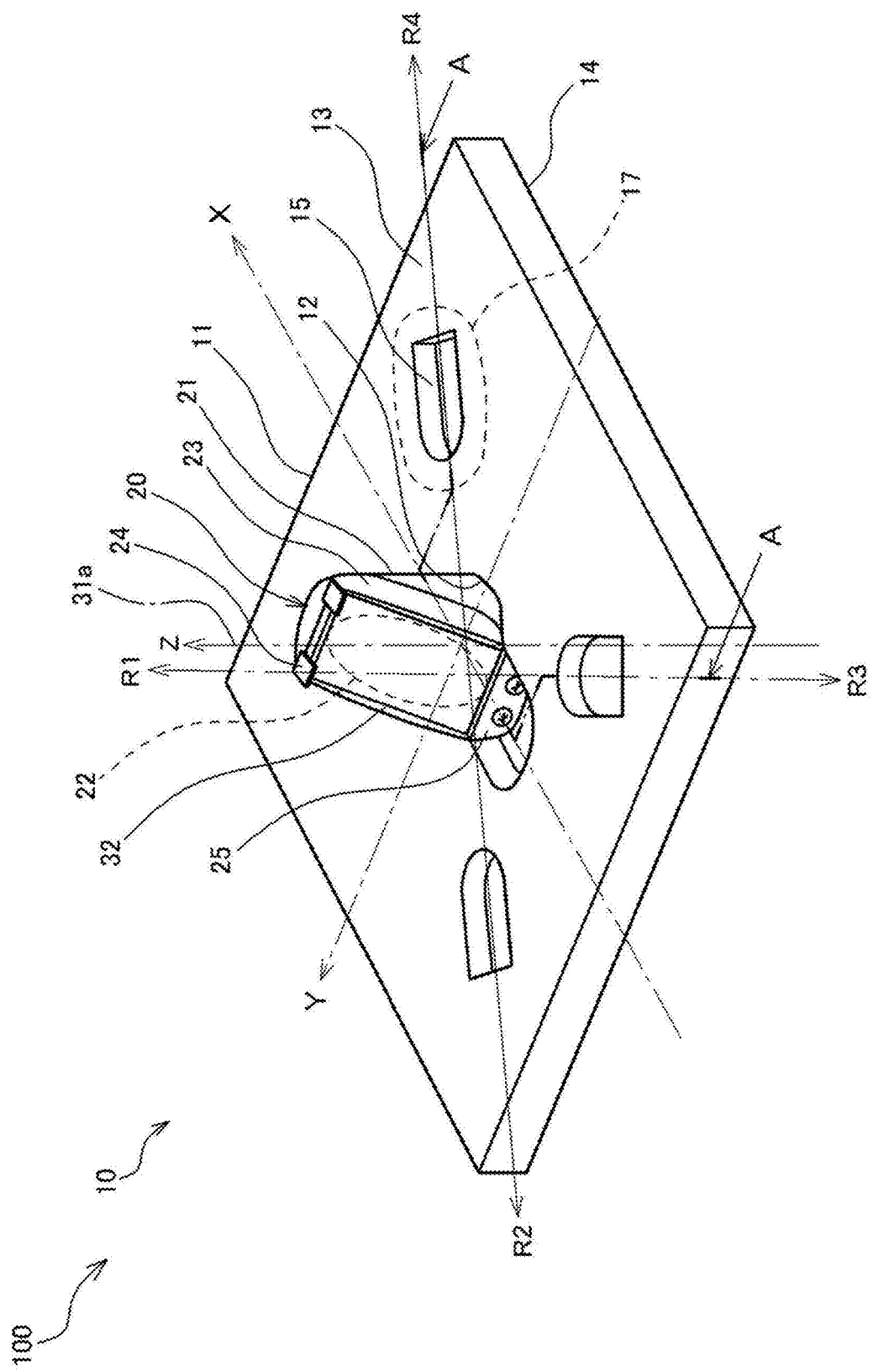
FIG. 2 is a perspective view that illustrates a base and a center unit of the camera module manufacturing apparatus according to the embodiment, from which a cover and a light source of an optical unit have been removed.

As illustrated in FIG. 2, the base 11 is a member that has a quadrangular flat shape, and a central portion of the base 11 has a through hole 12 in which the center unit 20 is attached. Also, each of peripheral portions 17 that are located between the central portion and the corners of the base 11 has a recess 15. As illustrated in FIG. 1, a through hole 16 is formed below the recess 15; the through hole 16 penetrates from the bottom of the recess 15 to an undersurface 14 of the base 11. Peripheral measurement charts 34, which will be described below, are each attached to the top surface of a corresponding one of the recesses 15.

As illustrated in FIGS. 1 and 2, the center unit 20 includes an upper cylindrical portion 21 and a lower lens attachment block 26. The cylindrical portion 21 has a cylindrical shape whose top surface is an oblique slope 23. The central measurement chart 32, which will be described below, is mounted over the oblique slope 23 by means of cushion members 24 and mounting hardware 25.

The lens attachment block 26 is generally shaped in a cylindrical column that has a larger outer diameter than the cylindrical portion 21. A hole 22 having a central axis extending in the vertical direction is formed at the center of the lens attachment block 26; the hole 22 is in communication with the inside of the cylindrical portion 21. Also, the lens attachment block 26 has four holes 28 each having a central axis extending in a direction that is tilted with respect to the central axis of the hole 22.

Figure 3:
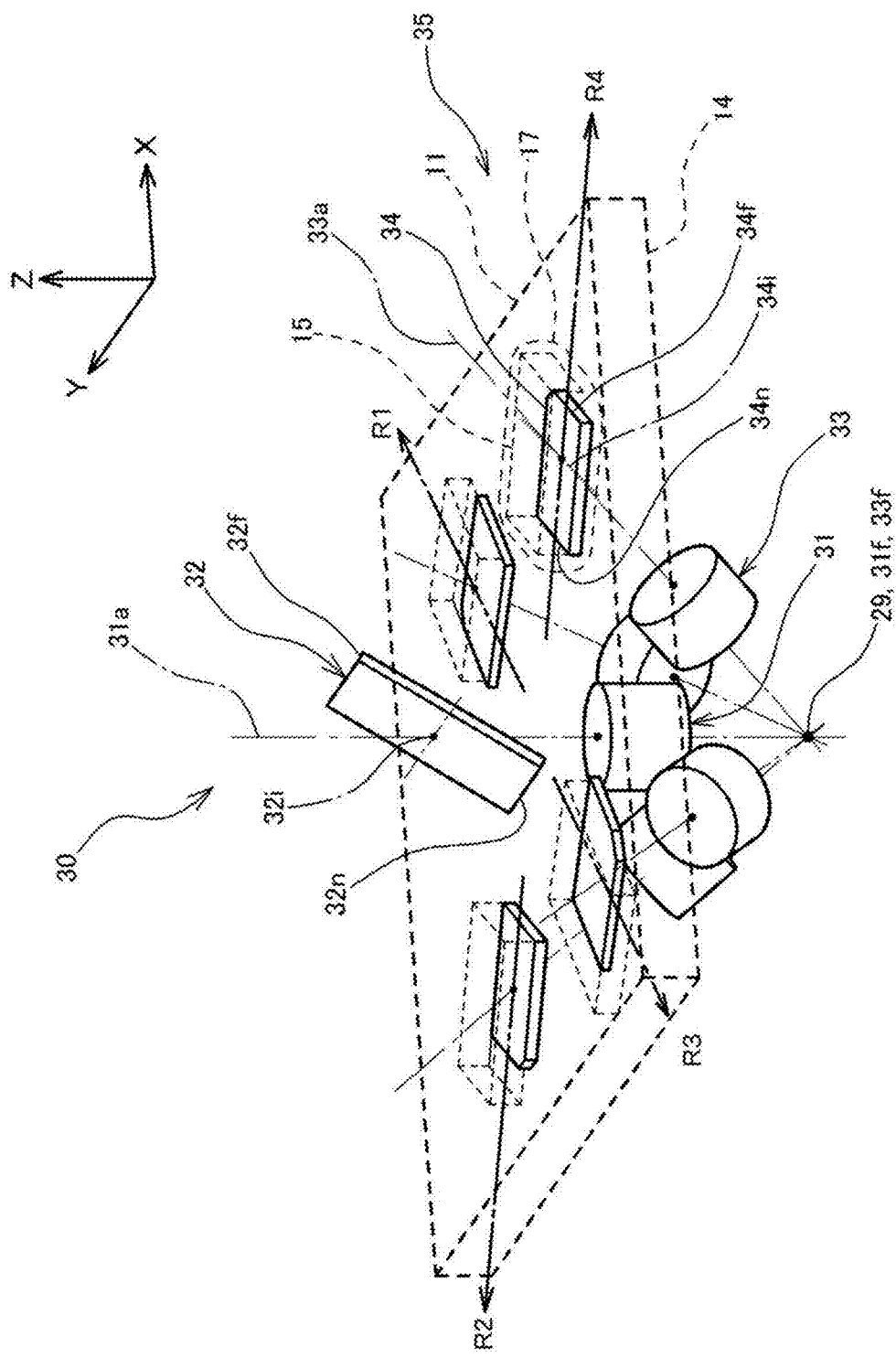
FIG. 3 is a perspective view that illustrates a structure of a central optical system and peripheral optical systems of the optical unit of the camera module manufacturing apparatus according to the embodiment.

A central collimator lens 31 is attached to the hole 22, and peripheral collimator lenses 33 are each attached to a corresponding one of the holes 28. As illustrated in FIG. 3, the central collimator lens 31 having an optical axis 31a and a focal point 31f and the peripheral collimator lenses 33 each having an optical axis 33a and a focal point 33f are attached to the holes 22 and 28 in a manner such that the optical axis 31a of the central collimator lens 31 and the optical axes 33a of the peripheral collimator lenses 33 intersect each other at a single point 29, and such that the focal points 31f and 33f of the central collimator lens 31 and the peripheral collimator lenses 33 are located at the single point 29. As such, the central collimator lens 31 and the peripheral collimator lenses 33 are attached to the lens attachment block 26 such that the focal points 31f and 33f are located at an identical position.

As illustrated in FIG. 1, the center unit 20 is attached to the base 11 by fitting the cylindrical portion 21 into the through hole 12 that is located in the central portion of the base 11 to bring an upper end surface 27 of the lens attachment block 26 into contact with the undersurface 14 of the base 11; then, the central collimator lens 31 is attached below the central portion of the base 11 to cause the optical axis 31a to be perpendicular to the undersurface 14 that is a lower surface of the base 11, and the peripheral collimator lenses 33 are attached below the base 11 to have each of the optical axes 33a be tilted with respect to the undersurface 14 of the base 11.

As the central measurement chart 32 is attached to place its undersurface 32a over the oblique slope 23 of the cylindrical portion 21 of the center unit 20, as illustrated in FIG. 3, the central measurement chart 32 is disposed to be tilted with respect to the undersurface 14 of the base 11. Meanwhile, the central collimator lens 31 is attached to the base 11 to have the optical axis 31a to be perpendicular to the undersurface 14 of the base 11. As such, the central measurement chart 32 is disposed to be tilted with respect to a plane that is perpendicular to the optical axis 31a of the central collimator lens 31.

Also, the peripheral measurement charts 34 are each attached to a corresponding one of the recesses 15 of the base 11 to place its undersurface 34a to be parallel with the undersurface 14 of the base 11. Meanwhile, the peripheral collimator lenses 33 are attached to the base 11 to cause the optical axes 33a to be tilted with respect to the undersurface 14 of the base 11. As such, the peripheral measurement charts 34 are each disposed to be tilted with respect to a plane that is perpendicular to the optical axis 33a of a corresponding one of the peripheral collimator lenses 33.

As illustrated in FIG. 3, the central collimator lens 31 and the central measurement chart 32 constitute a central optical system 30, and the four peripheral collimator lenses 33 and the four peripheral measurement charts 34 constitute four peripheral optical systems 35. In the following description, directions extending from the central portion of the base 11 toward the peripheral portions 17 on the surfaces of the peripheral measurement charts 34 along the optical axes 33a of the peripheral collimator lenses 33 are referred to as R1, R2, R3, and R4, and directions that are orthogonal to R1, R2, R3, and R4 on the surfaces of the peripheral measurement charts 34 are referred to as S1, S2, S3, and S4.

Figure 4:
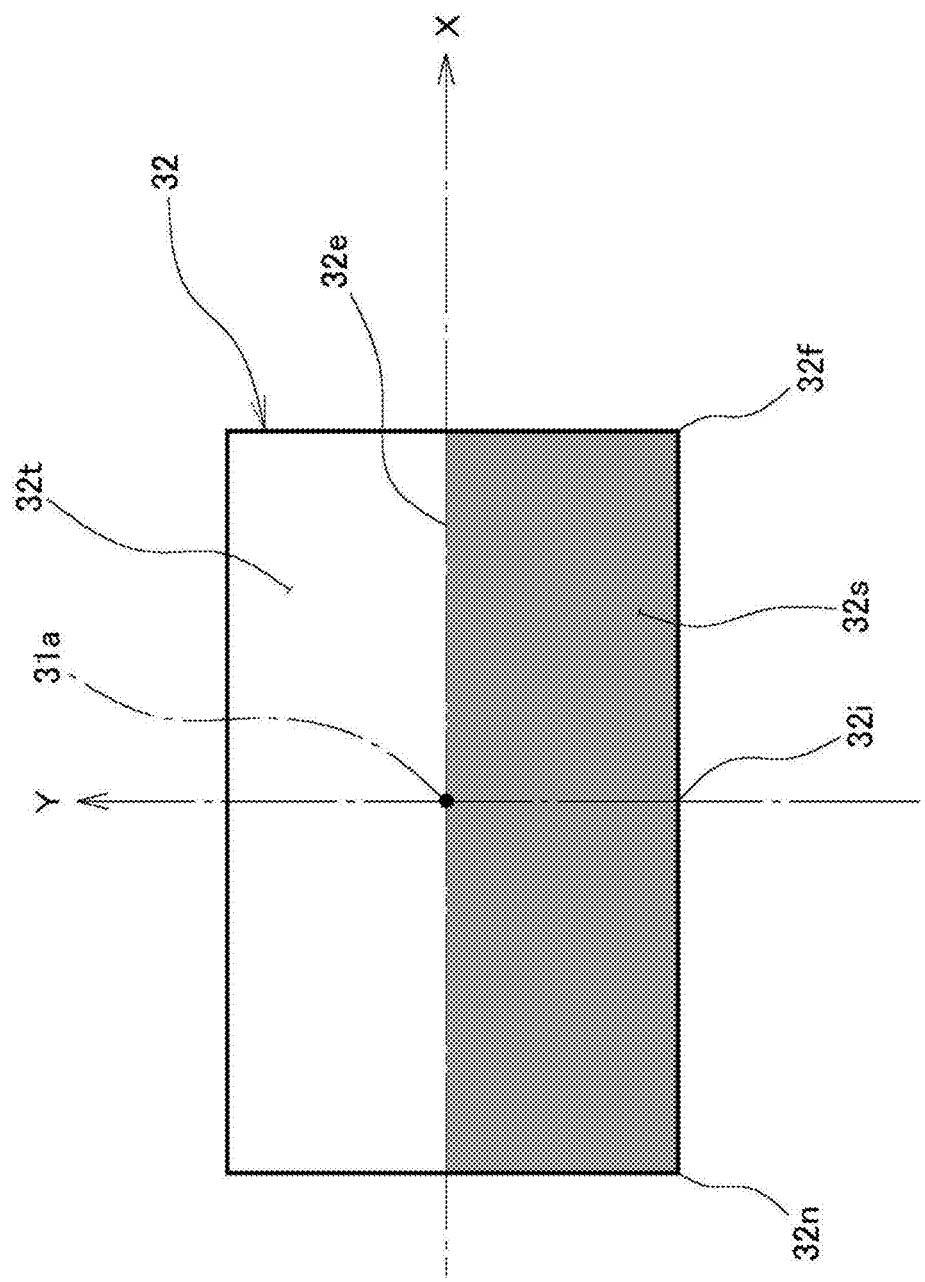
FIG. 4 is a plan view that illustrates a pattern of a central measurement chart.

FIG. 4 is a plan view that illustrates a pattern of the central measurement chart 32. The central measurement chart 32 includes a transparent glass plate that transmits light and, on its surface, a light shielding portion 32s that blocks light. A half of the central measurement chart 32 that is located on the positive (+) side in the y direction is a light transmitting portion 32t that transmits light, and a half of the central measurement chart 32 that is located on the negative (−) side in the y direction is the light shielding portion 32s that does not transmit light. The light shielding portion 32s may be formed by, for example, applying black chromium, some of which is later etched away to form the light transmitting portion 32t, or may be formed by applying a black coating. A center edge 32e that extends in the x direction is formed between the light transmitting portion 32t and the light shielding portion 32s.

As illustrated in FIG. 3, the central measurement chart 32 is attached to the slope 23 of the cylindrical portion 21 to place a distal end 32f on the upper side in the tilt direction and a proximal end 32n on the lower side in the tilt direction such that the optical axis 31a of the central collimator lens 31 passes through a center position 32i that is located at the center in the x direction. As such, when the central measurement chart 32 is attached to the center unit 20, as illustrated in FIG. 4, the center edge 32e passes through the optical axis 31a of the central collimator lens 31 and extends in the tilt direction.

Figure 5:
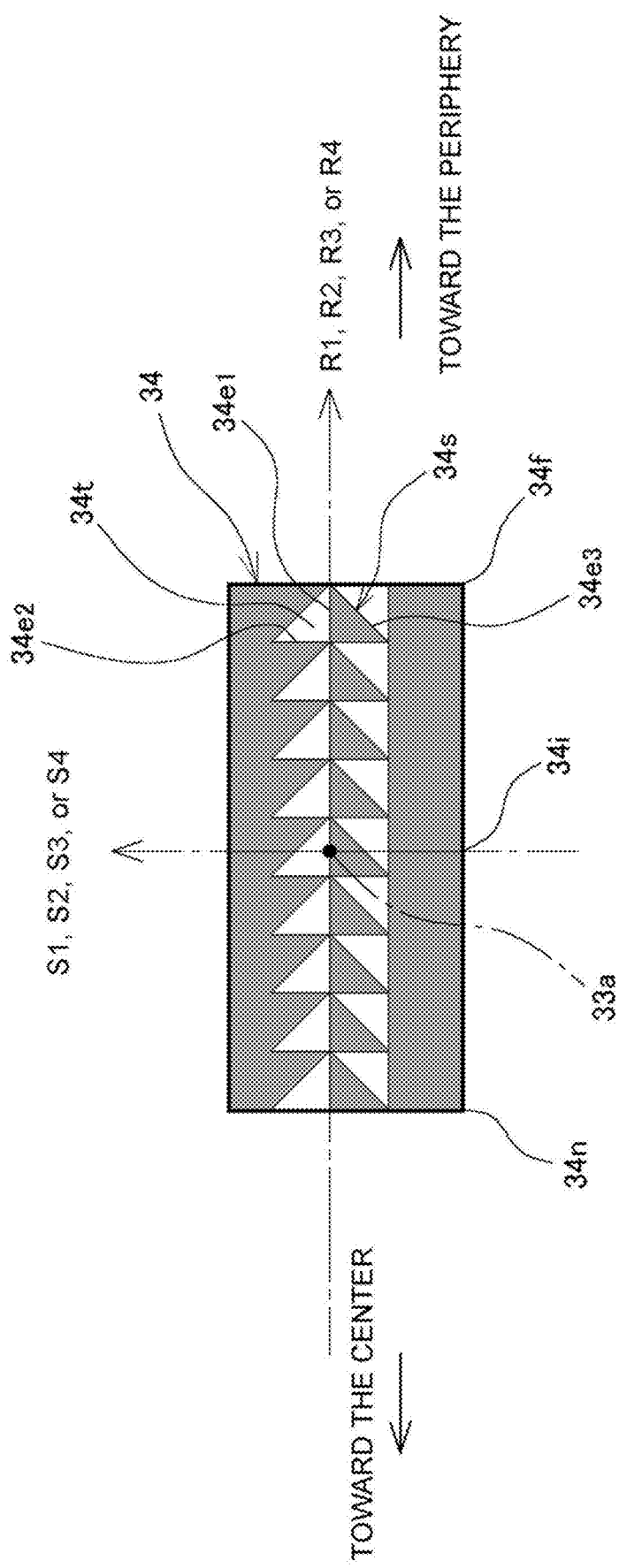
FIG. 5 is a plan view that illustrates a pattern of a peripheral measurement chart.

As illustrated in FIG. 5, each of the peripheral measurement charts 34 includes triangular light transmitting portions 34t and triangular light shielding portions 34s that are alternately disposed adjacent to each other in the direction R1, R2, R3, or R4 and its orthogonal direction S1, S2, S3, or S4. The light shielding portions 34s may be formed by, for example, applying black chromium, some of which is later etched away to form the light transmitting portions 34t, or may be formed by applying a black coating. A first edge 34e1 that extends in the direction R1, R2, R3, or R4 is formed between a triangular light shielding portion 34s and a triangular light transmitting portion 34t that are disposed adjacent to each other on opposite sides of the axis R1, R2, R3, or R4. Also, a second edge 34e2 that extends in the direction S1, S2, S3, or S4 is formed between a triangular light shielding portion 34s and a triangular light transmitting portion 34t that are adjacent to each other in the direction R1, R2, R3, or R4. Also, a third edge 34e3 is formed on a side of a triangular light transmitting portion 34t that is tilted 45 degrees from R1, R2, R3, or R4.

As illustrated in FIG. 3, the peripheral measurement charts 34 are each attached to a corresponding one of the peripheral portions 17 of the base 11 to place R1, R2, R3, and R4 positive (+) side ends to be farther away from the central portion of the base 11 and R1, R2, R3, and R4 negative (−) side ends to be closer to the central portion of the base 11 such that the optical axes 33a of the peripheral collimator lenses 33 pass through center positions 34i that are each located at the center in the direction R1, R2, R3, or R4. When the peripheral measurement charts 34 are attached to the peripheral portions 17 of the base 11, the R1, R2, R3, and R4 positive (+) side ends that are farther away from the central portion of the base 11 form distal ends 34f that are at a greater distance from the peripheral collimator lenses 33 along the optical axes 33a, and the R1, R2, R3, and R4 negative (−) side ends that are closer to the central portion of the base 11 form proximal ends 34n that are at a smaller distance from the peripheral collimator lenses 33 along the optical axes 33a.

As such, when the peripheral measurement charts 34 are attached to the base 11, as illustrated in FIG. 5, the first edges 34e1 pass through the optical axes 33a of the peripheral collimator lenses 33 and extend in a direction from the central portion of the base 11 toward a corresponding one of the peripheral portions 17 of the base 11, and the second edges 34e2 and the third edges 34e3 extend in directions that intersect the first edges 34e1.

As illustrated in FIGS. 1 and 2, the light source 36 is attached to the top surface 13 of the base 11. The light source 36 is shaped like a ring and is attached to the base 11 to have a central axis that is coaxial with the optical axis 31a of the central collimator lens 31. The light source 36 may include, for example, a plurality of LEDs that are disposed in the shape of a ring. Also, the light source 36 may be in the shape of a hexagonal ring or an octagonal ring.

The cover 37 for covering the top surface 13 of the base 11 and the cylindrical portion 21 of the center unit 20 that projects upward from the top surface 13 of the base 11 is attached above the top surface 13 of the base 11. The cover 37 has an inner surface that is white and reflective; the inner surface of the cover 37 reflects light emitted upward from the light source 36 and causes the light to be incident upon the central measurement chart 32 from above. The inner surface of the cover 37 also causes the reflected light to be incident upon the peripheral measurement charts 34. With this configuration, the central measurement chart 32 and the four peripheral measurement charts 34 can be illuminated evenly.

Figure 6:
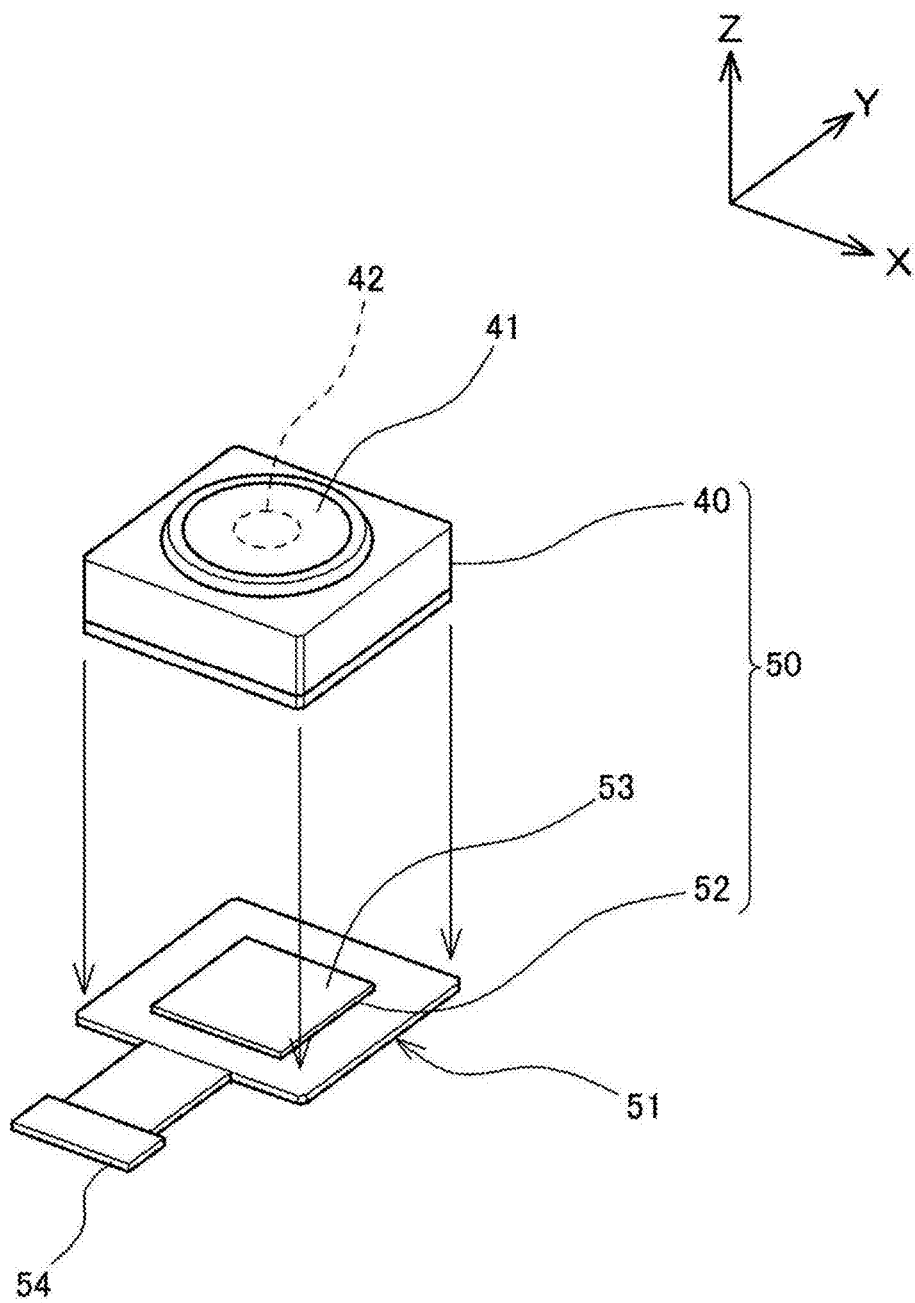
FIG. 6 is a perspective view that illustrates a camera module that is assembled by the camera module manufacturing apparatus according to the embodiment.

As illustrated in FIG. 6, the camera module 50 includes the lens unit 40 that incorporates the taking lens 41 and the sensor board 51 to which the image sensor 52 is attached, the lens unit 40 and the sensor board 51 being joined together with an ultraviolet curing adhesive.

The taking lens 41 that is incorporated in the lens unit 40 has, on its top surface, an entrance pupil 42 which is an area upon which light coming from the central collimator lens 31 and the peripheral collimator lenses 33 is incident.

The image sensor 52 converts an image that is formed on an image capture plane 53 by the taking lens 41 into an electrical image signal. An output terminal 54 for outputting an image signal coming from the image sensor 52 is attached to the sensor board 51. The output terminal 54 is connected to the controller 57, and an image signal that is output from the image sensor 52 is input to the controller 57.

As illustrated in FIG. 1, the six-degree-of-freedom actuator 56 that is attached on a support 110, the stage 55 that is attached above the six-degree-of-freedom actuator 56 and holds the sensor board 51 on its top surface, and the robot arm 45 that is disposed above the stage 55 and below the optical unit 10 and holds the lens unit 40 are disposed below the optical unit 10. The optical unit 10 is attached to the support 110 by means of a frame which is not illustrated.

The six-degree-of-freedom actuator 56 includes therein six stepping motors and drives the stepping motors to move the stage 55 that is attached above the six-degree-of-freedom actuator 56 with respect to six degrees of freedom; that is, in the x direction, in the y direction, in the z direction, about the x axis, about the y axis, and about the z axis. The six-degree-of-freedom actuator 56 is connected to the controller 57, and the stepping motors operate in response to a command from the controller 57. It should be noted that the present invention is not limited to stepping motors, but the stage 55 may also be driven by servomotors.

The stage 55 includes a holder, which is not illustrated, for holding the sensor board 51 on its top surface and holds the sensor board 51 on its top surface. It should be noted that the stage 55 may create a vacuum and suck the sensor board 51 on its top surface.

The robot arm 45 includes a chuck 46 for holding the lens unit 40 by pinching it at its tip. The robot arm 45 moves in the x, y, and z directions together with the chuck 46 by means of a drive unit which is not illustrated. The robot arm 45 operates the chuck 46 at its tip in a storage of the lens unit 40 to pick up the lens unit 40 by pinching it, moves the lens unit 40 to above the sensor board 51 that is held on the stage 55, and holds the lens unit 40 at a position above the sensor board 51.

The controller 57 is a computer that includes therein a CPU 58 that performs information processing and a memory 59 that stores, for example, an operation program or data. The six-degree-of-freedom actuator 56, the robot arm 45, and the light source 36 are connected to the controller 57 and operate in response to commands from the controller 57. Also, the image sensor 52 is connected to the controller 57, and an image signal that is output from the image sensor 52 is input to the controller 57.

The controller 57 causes the robot arm 45 to hold the lens unit 40 at a predetermined position above the sensor board 51, and causes the six-degree-of-freedom actuator 56 to adjust the position of the top surface of the stage 55 in the x direction, in the y direction, in the z direction, about the x axis, about the y axis, and about the z axis to adjust a relative position of the lens unit 40 and the sensor board 51 in the x direction, in the y direction, in the z direction, about the x axis, about the y axis, and about the z axis.

Referring next to FIGS. 7 to 16, an operation of the camera module manufacturing apparatus 100 that is configured as described above will be described.

Figure 7:
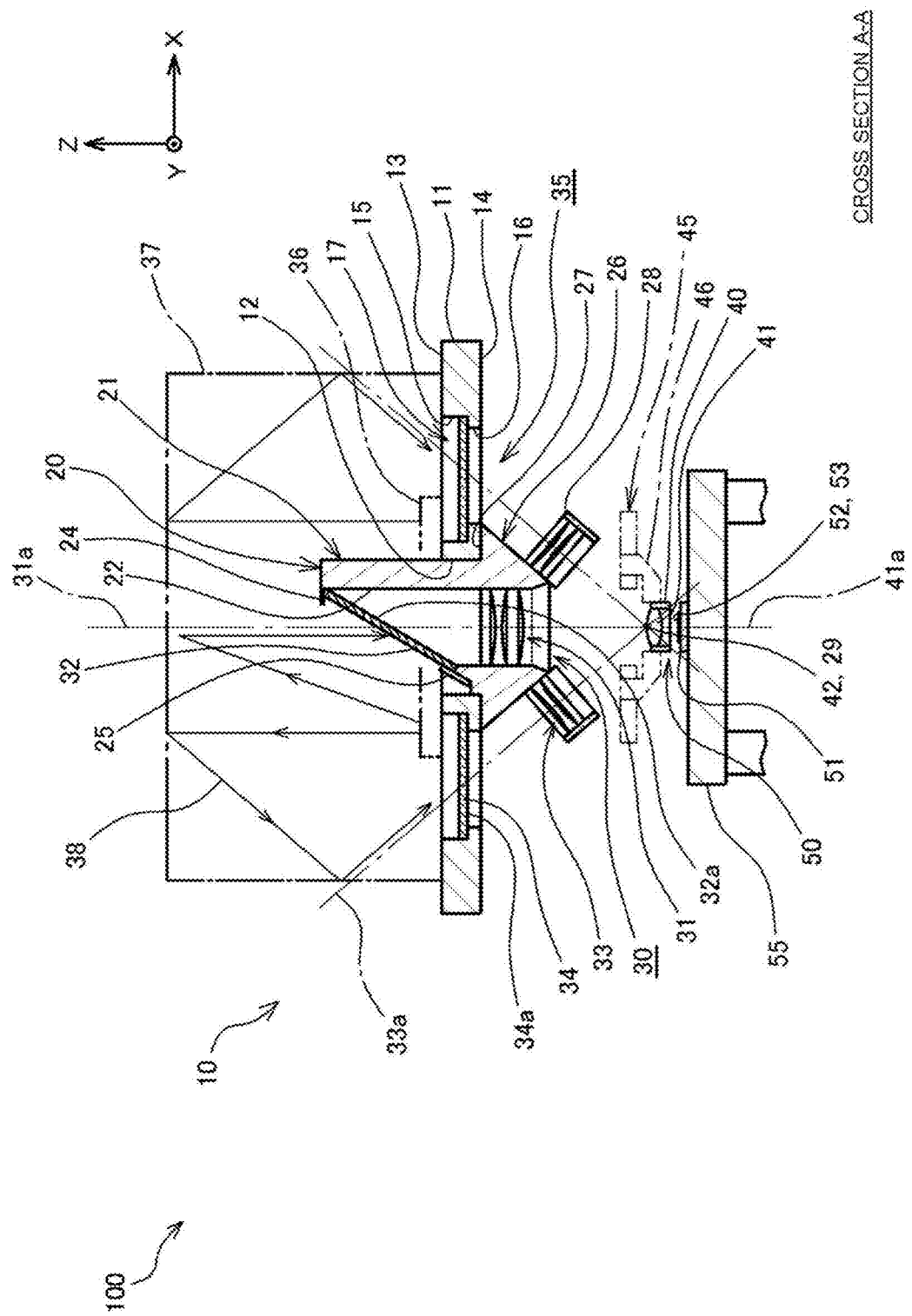
FIG. 7 is a cross-sectional view taken along line A-A of FIG. 2 and illustrates an operation of the camera module manufacturing apparatus according to the embodiment.

As illustrated in FIG. 7, first, the sensor board 51 is placed on the top surface of the stage 55, and the sensor board 51 is held on the top surface of the stage 55. An ultraviolet curing adhesive is applied beforehand at a portion of the sensor board 51 where it is joined with the lens unit 40.

The controller 57 causes the robot arm 45 to pick up the lens unit 40 in the storage and to move the lens unit 40 to above the sensor board 51 that is held on the top surface of the stage 55. The controller 57 causes the robot arm 45 to hold the lens unit 40 at a position where the taking lens 41 has an optical axis 41a that is coaxial with the optical axis 31a of the central collimator lens 31, and where a center position of the entrance pupil 42 of the taking lens 41 coincides with the single point 29 at which the focal point 31f of the central collimator lens 31 and the focal points 33f of the peripheral collimator lenses 33 are located.

The controller 57 then causes the six-degree-of-freedom actuator 56 to operate to set the position of the image capture plane 53 of the image sensor 52 to be located at a predetermined initial position. The predetermined initial position may be, for example, a design dimension position.

Figure 8:
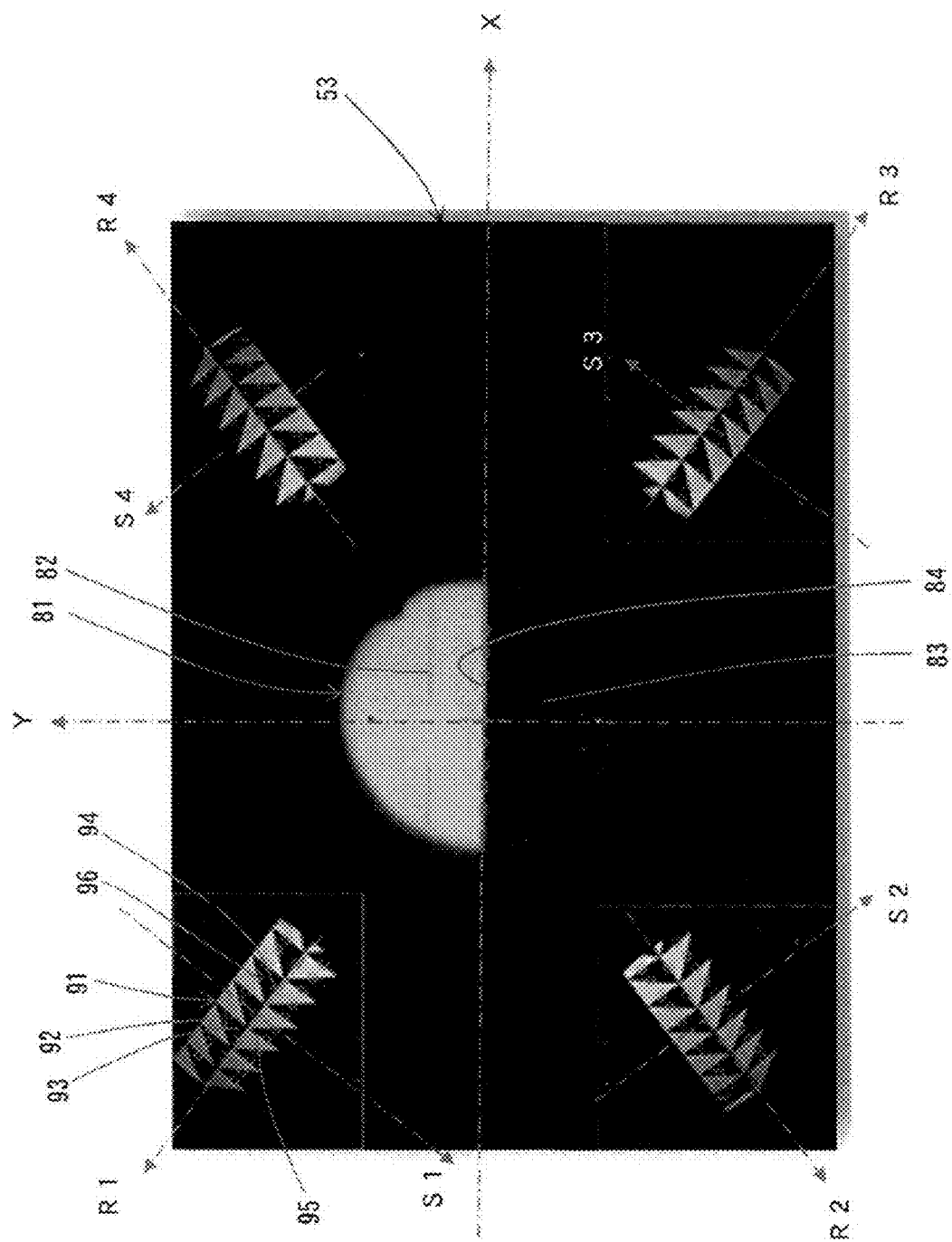
FIG. 8 is a plan view that illustrates an image of the central measurement chart and images of the peripheral measurement charts that are formed on an image capture plane of an image sensor.
Figure 9:
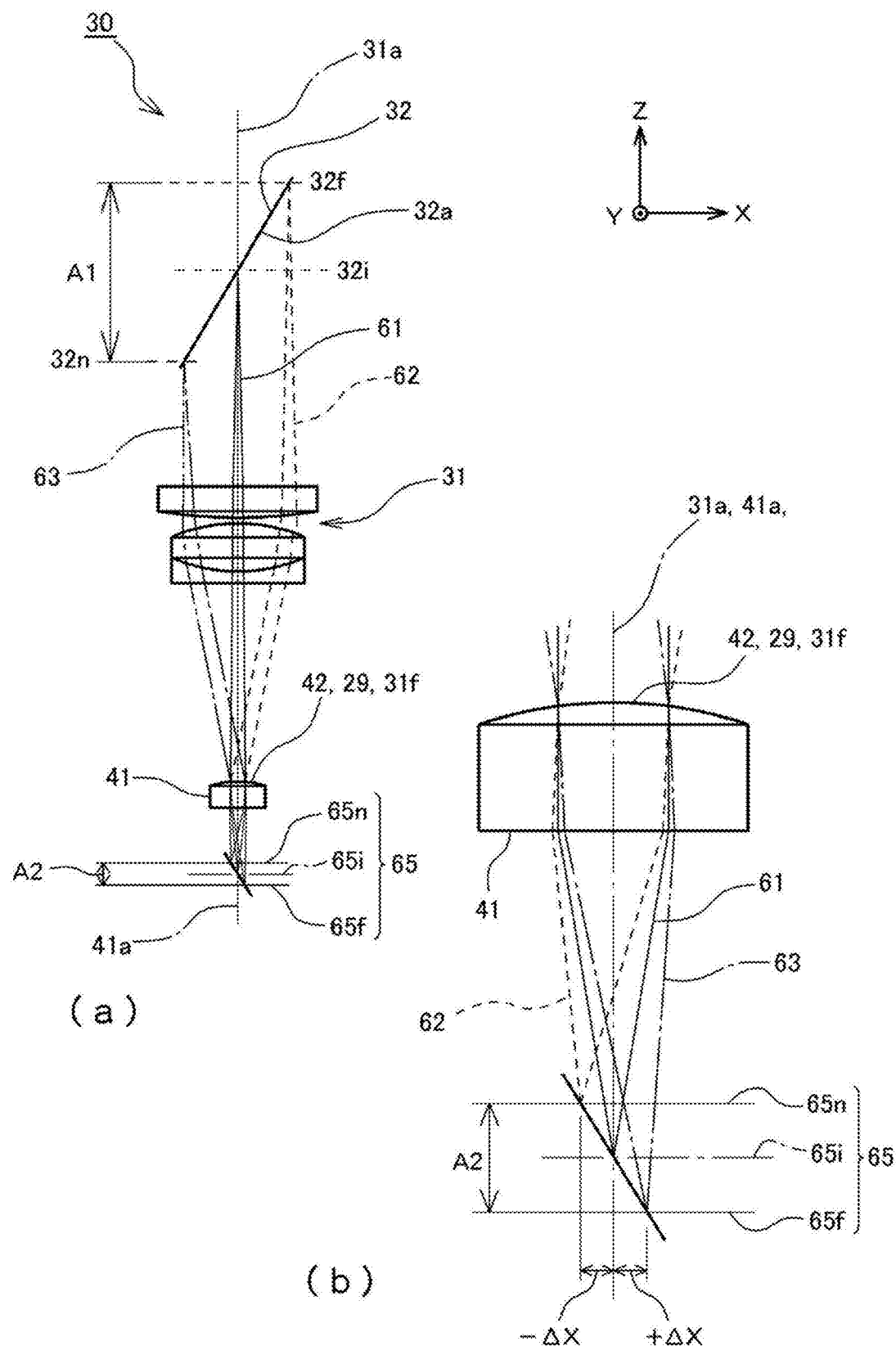
FIG. 9 includes an overall optical path diagram (a) of the central optical system of the camera module manufacturing apparatus according to the embodiment and a partial detailed optical path diagram (b) of a portion near the image capture plane.

The controller 57 then causes the light source 36 to emit light. Light is emitted from an upper surface of the light source 36, and then, as illustrated by arrows 38 in FIG. 7, the light is reflected by the inner surface of the cover 37 to be incident upon the central measurement chart 32 and the peripheral measurement charts 34. Light that is incident upon the central measurement chart 32 of the central optical system 30 passes through the central collimator lens 31 to be incident upon the taking lens 41 via the entrance pupil 42 to reach a central portion of the image sensor 52, and as illustrated in FIG. 8, an image 81 of the central measurement chart 32 is formed in a central portion of the image capture plane 53 of the image sensor 52. The image 81 includes a white semicircular image 82 that is formed as light is transmitted through the light transmitting portion 32t of the central measurement chart 32, a black image 83 that is formed as light is blocked by the light shielding portion 32s of the central measurement chart 32, and an image 84 that is a boundary between the white semicircular image 82 and the black image 83. The image 84 is an image of the center edge 32e in the central measurement chart.

Also, light that is incident upon the peripheral collimator lenses 33 of the four peripheral optical systems 35 passes through the peripheral collimator lenses 33 to be incident upon the taking lens 41 via the entrance pupil 42 to reach four peripheral portions of the image sensor 52, and as illustrated in FIG. 8, images 91 of the peripheral measurement charts 34 are formed in four peripheral portions of the image capture plane 53 of the image sensor 52. The images 91 include white triangular images 92 that are formed as light is transmitted through the light transmitting portions 34t of the peripheral measurement charts 34, black images 93 that are formed as light is blocked by the light shielding portions 34s of the peripheral measurement charts 34, and images 94, 95, and 96 that are boundaries between the white images 92 and the black images 93. The images 94, 95, and 96 are images of the first edge 34e1, the second edge 34e2, and the third edge 34e3 of the peripheral measurement charts 34.

Details of the central optical system 30 and details of the image 81 that is formed in the central portion of the image capture plane 53 by the central optical system 30 will now be described.

As illustrated in FIG. 9(a), the central collimator lens 31 has its focal point 31f on the side on which the taking lens 41 is located. The lens unit 40 is held at a position where the focal point 31f of the central collimator lens 31 coincides with the center position of the entrance pupil 42 of the taking lens 41. With this configuration, the central collimator lens 31 and the taking lens 41 constitute a central measurement chart side telecentric optical system. A principal ray that is transmitted through the central measurement chart 32 is converged to the focal point 31f through the central collimator lens 31 to be incident upon the taking lens 41 via the entrance pupil 42 of the taking lens 41, and an image corresponding to the pattern of the central measurement chart 32 is formed on an image formation plane 65, as illustrated in FIG. 9(b).

A ray that is transmitted through the center position 32i of the central measurement chart 32 through which the optical axis 31a of the central collimator lens 31 passes travels along an optical path 61 as illustrated by solid lines in FIGS. 9(a) and 9(b), and an image corresponding to the pattern of the center position 32i is formed in a central portion of a reference image formation plane 65i that is located near the optical axis 31a.

Meanwhile, as the central measurement chart 32 is disposed to be tilted with respect to a plane that is perpendicular to the optical axis 31a of the central collimator lens 31, a ray that is transmitted through the distal end 32f of the central measurement chart 32 travels along an optical path 62 as illustrated by broken lines in FIGS. 9(a) and 9(b), and an image corresponding to the pattern of the distal end 32f is formed on an upper image formation plane 65n that is located above the reference image formation plane 65i, at a position deviated by $-\Delta X$ from the optical axis 31a in the x direction that is orthogonal to the optical axis 31a.

Also, a ray that is transmitted through the proximal end 32n of the central measurement chart 32 travels along an optical path 63 as illustrated by alternate long and short dashed lines in FIGS. 9(a) and 9(b), and an image corresponding to the pattern of the proximal end 32n is formed on a lower image formation plane 65f that is located below the reference image formation plane 65i, at a position deviated by $+\Delta X$ from the optical axis 31a in the x direction that is orthogonal to the optical axis 31a.

Figure 10:
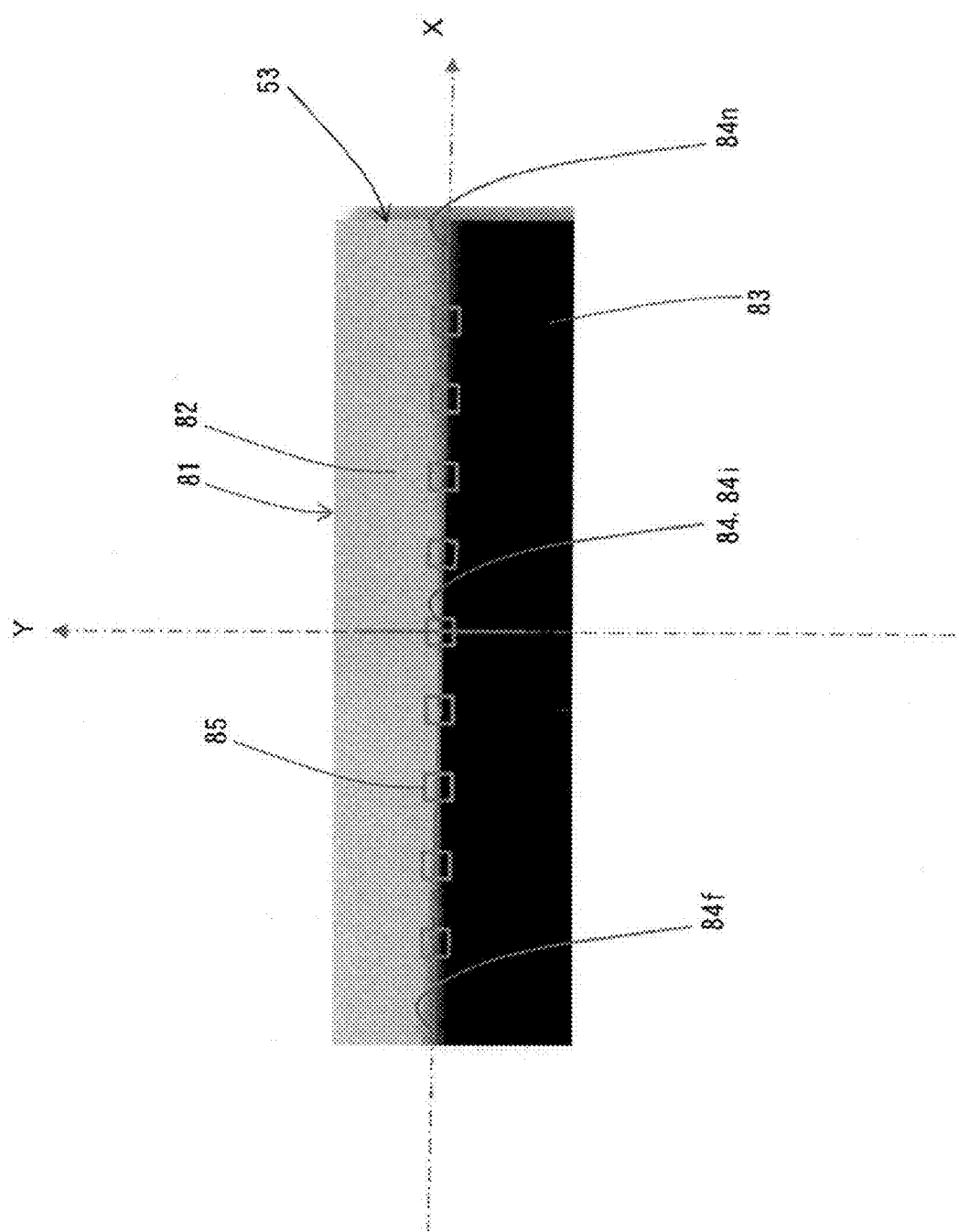
FIG. 10 is an enlarged plan view of the image of the central measurement chart illustrated in FIG. 8.

As such, when the height of the sensor board 51 is adjusted by the six-degree-of-freedom actuator 56 to place the image capture plane 53 at the height of the reference image formation plane 65i, as illustrated in a central portion in FIG. 10, a not-blurred sharp image 84i corresponding to the center edge 32e at the center position 32i of the central measurement chart 32 is formed on the image capture plane 53, and blurred images 84f and 84n corresponding to the center edge 32e at the distal end 32f and at the proximal end 32n are formed on the image capture plane 53.

The image 81 of the central measurement chart 32 formed on the image capture plane 53 as illustrated in FIG. 10 is converted into a central image signal by the image sensor 52, and the central image signal is input to the controller 57. The controller 57 sets measurement points 85 in an image of a portion corresponding to the center edge 32e at predetermined intervals along the x direction as illustrated in FIG. 10. The controller 57 then calculates a focus assessment value for assessing whether or not focus is achieved at each of the measurement points 85. In the illustrated embodiment, spatial frequency response is used as the focus assessment value, but the present invention is not limited to this example; for example, contrast or other focus assessment values may be used.

The controller 57 uses the spatial frequency response calculated for each of the measurement points 85 to generate a central portion through focus graph as illustrated in FIG.

11, the central portion through focus graph including a line "a" that represents changes in spatial frequency response with respect to the positions of the measurement points 85 in the x direction in the central portion of the image capture plane 53.

Figure 11:
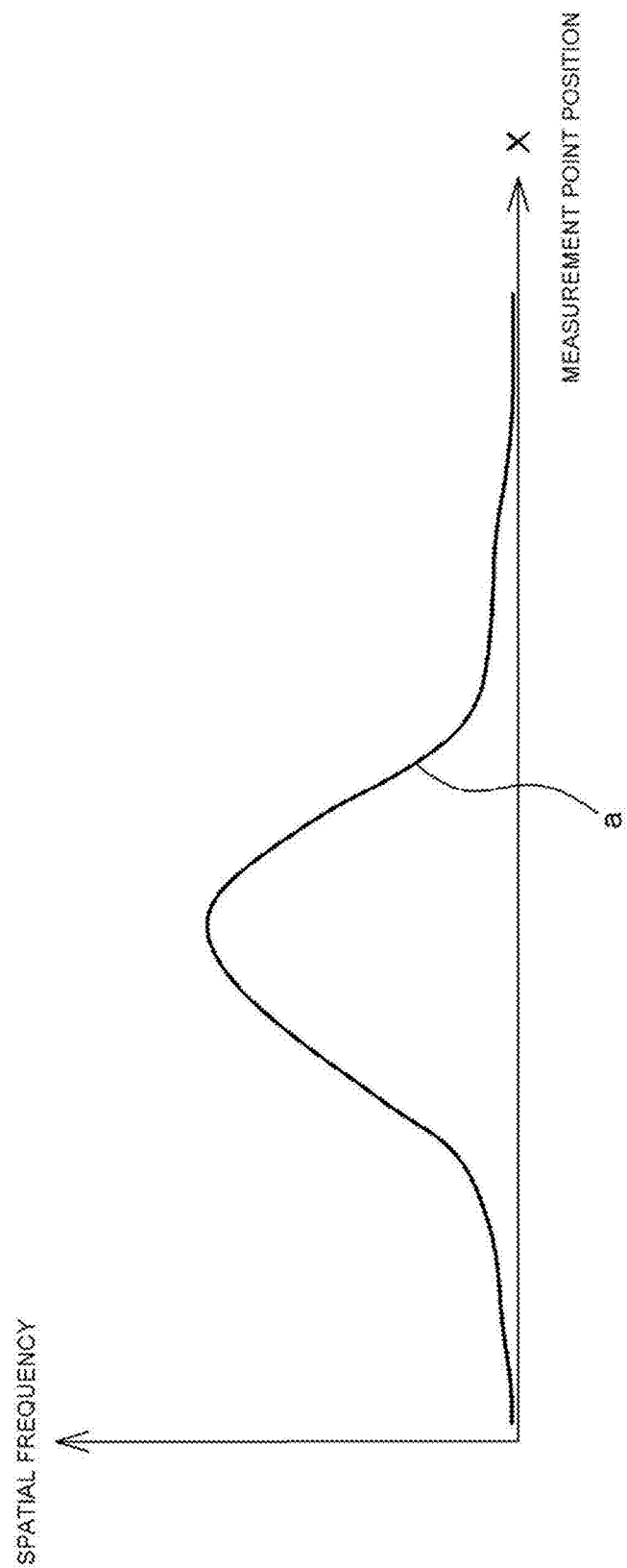
FIG. 11 is a graph that illustrates changes in spatial frequency response with respect to positions of measurement points for the central measurement chart illustrated in FIG. 10.
Figure 12:
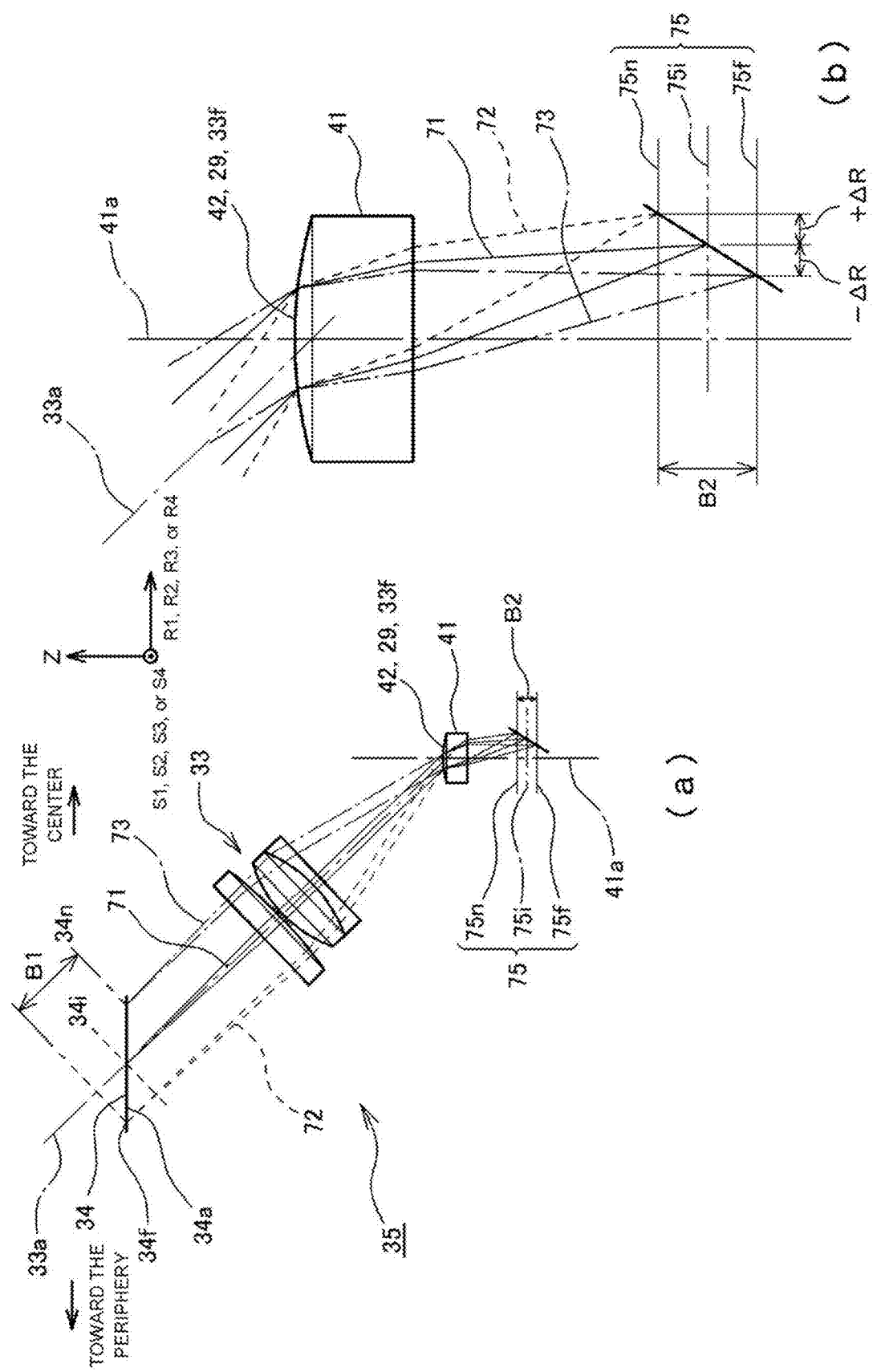
FIG. 12 includes an overall optical path diagram (a) of a peripheral optical system of the camera module manufacturing apparatus according to the embodiment and a partial detailed optical path diagram (b) of a portion near the image capture plane.

As described above, as the central measurement chart 32 of the central optical system 30 is disposed to be tilted with respect to a plane that is perpendicular to the optical axis 31a of the central collimator lens 31, the height of the image formation plane 65 upon which an image of the central measurement chart 32 is formed by the taking lens 41 varies with respect to the distance from the optical axis 41a of the taking lens 41 in an orthogonal direction to the optical axis 41a; specifically, the upper image formation plane 65n, the reference image formation plane 65i, and the lower image formation plane 65f. Therefore, a plurality of images 81 of the central measurement chart 32 for which the image formation plane 65 of the taking lens 41 varies in height can be obtained in a single image capture, and the central portion through focus graph as illustrated in FIG. 11 can be generated in a single image capture.

Details of the peripheral optical systems 35 and details of the images 91 that are formed in the peripheral portions of the image capture plane 53 by the peripheral optical systems 35 will now be described.

Similar to the central optical system 30, the peripheral collimator lenses 33 of the peripheral optical systems 35 have their focal points 33f on the side on which the taking lens 41 is located; the focal points 33f of the peripheral collimator lenses 33 coincide with the center position of the entrance pupil 42 of the taking lens 41; and each of the peripheral collimator lenses 33 and the taking lens 41 constitute a peripheral measurement chart side telecentric optical system. A principal ray that is transmitted through the respective peripheral measurement charts 34 as illustrated in FIG. 12(a) is converged to the focal point 33f through the peripheral collimator lens 33 to be incident upon the taking lens 41 via the entrance pupil 42 of the taking lens 41, and an image corresponding to the pattern of the peripheral measurement chart 34 is formed on an image formation plane 75, as illustrated in FIG. 12(b).

A ray that is transmitted through the center position 34i of the peripheral measurement chart 34 through which the optical axis 33a of the peripheral collimator lens 33 passes travels along an optical path 71 as illustrated by solid lines in FIGS. 12(a) and 12(b), and an image corresponding to the pattern of the center position 34i is formed on a reference image formation plane 75i.

On the other hand, as the peripheral measurement chart 34 is disposed to be tilted with respect to a plane that is perpendicular to the optical axis 33a of the peripheral collimator lens 33, a ray that is transmitted through the distal end 34f of the peripheral measurement chart 34 travels along an optical path 72 as illustrated by broken lines in FIGS. 12(a) and 12(b), and an image corresponding to the pattern of the distal end 32f is formed on an upper image formation plane 75n that is located above the reference image formation plane 75i, at a position deviated by +ΔR toward the peripheral portion from the position where an image corresponding to the pattern of the center position 34i is formed.

Also, a ray that is transmitted through the proximal end 34n of the peripheral measurement chart 34 travels along an optical path 73 as illustrated by alternate long and short dashed lines in FIGS. 12(a) and 12(b), and an image corresponding to the pattern of the proximal end 34n is formed on a lower image formation plane 75f that is located below the reference image formation plane 75i, at a position deviated by −ΔR toward the central portion from the position where an image corresponding to the pattern of the center position 34i is formed.

Figure 13:
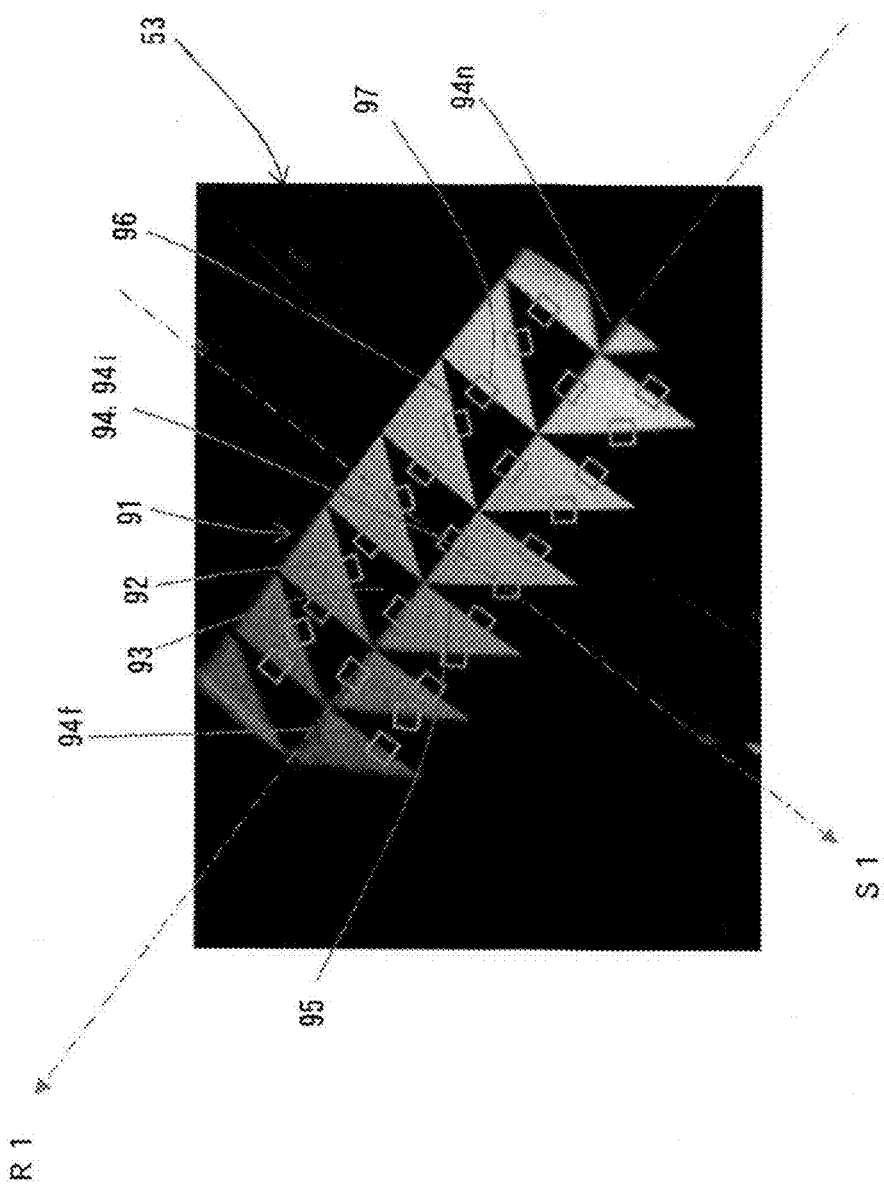
FIG. 13 is an enlarged plan view of an image of a peripheral measurement chart illustrated in FIG. 8.

As such, when the height of the sensor board 51 is adjusted by the six-degree-of-freedom actuator 56 to place the image capture plane 53 at the height of the reference image formation plane 75i, as illustrated in FIG. 13, a not-blurred sharp image 94i corresponding to the first edge 34e1 that is located near the center position 34i is formed on the image capture plane 53 in the peripheral portion, and blurred images 94f and 94n corresponding to the first edge 34e1 at the distal end 32f and at the proximal end 32n are formed on the image capture plane 53.

Figure 14:
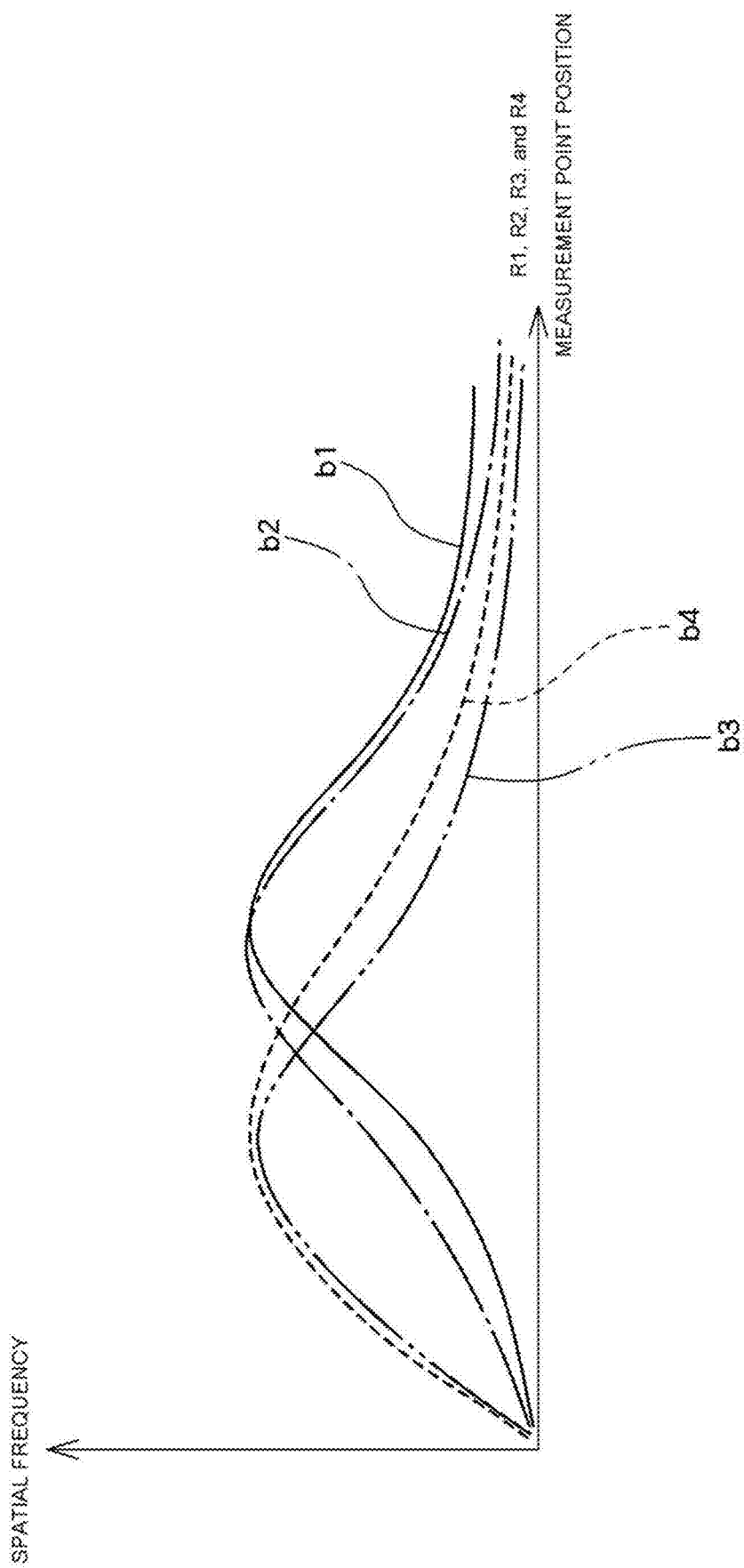
FIG. 14 is a graph that illustrates changes in spatial frequency response with respect to positions of measurement points for the peripheral measurement chart illustrated in FIG. 13.
Figure 15:
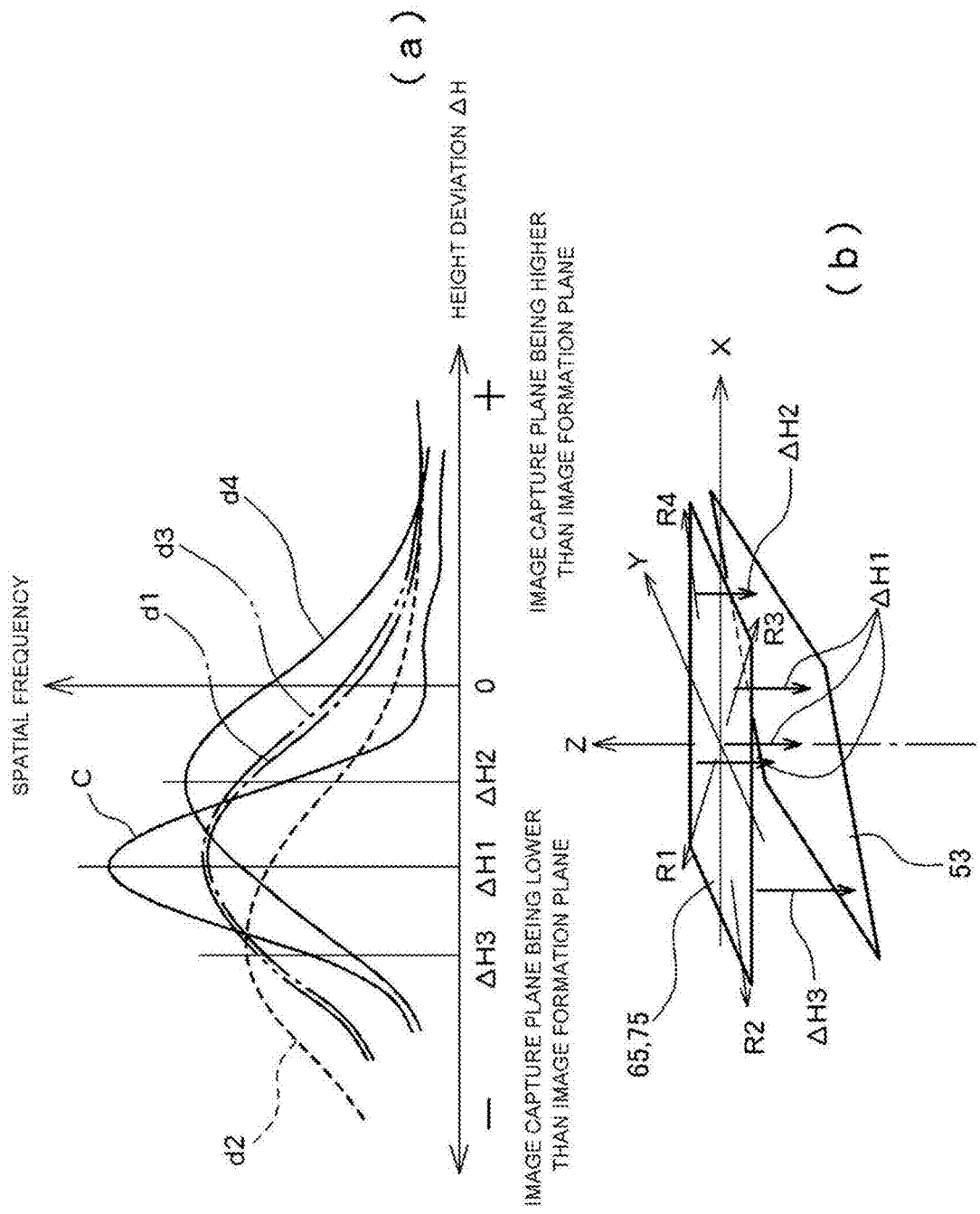
FIG. 15 is a graph that illustrates changes in spatial frequency response with respect to the height deviation $\Delta H$ between an image formation plane of a taking lens and the image capture plane of the image sensor in a central portion and peripheral portions of the image sensor for a case where the image formation plane of the taking lens and the image capture plane of the image sensor are deviated in height and tilted from each other.
Figure 16:
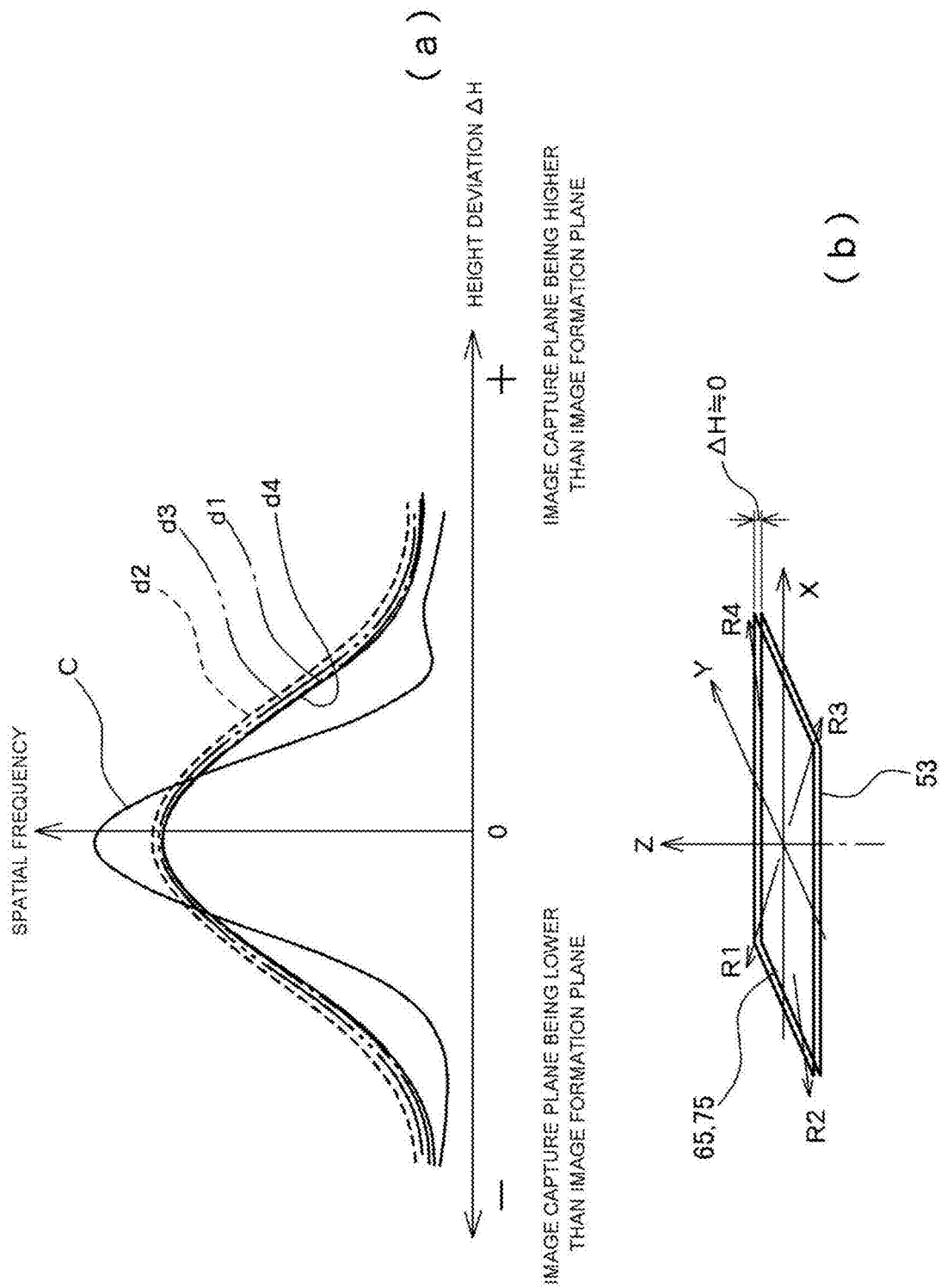
FIG. 16 is a graph that illustrates changes in spatial frequency response with respect to the height deviation $\Delta H$ between the image formation plane of the taking lens and the image capture plane of the image sensor in the central portion and the peripheral portions of the image sensor for a case where the image formation plane of the taking lens and the image capture plane of the image sensor are adjusted to be substantially flush with each other.

As illustrated in FIG. 13, the controller 57 sets measurement points 97 in the images 94, 95, and 96 of portions corresponding to the first edge 34e1, the second edge 34e2, and the third edge 34e3 at predetermined intervals along the R1 direction. The controller 57 then calculates spatial frequency response for each of the measurement points 97 to generate a line "b1," as illustrated in FIG. 14, that represents changes in spatial frequency response with respect to the positions of the measurement points 97 in the R1 direction in the peripheral portion of the image capture plane 53. Similarly, the controller 57 generates similar through focus graphs for the peripheral portions that extend in the remaining R2, R3, and R4 directions. A peripheral portion through focus graph including lines "b1", "b2", "b3", and "b4" for the R1, R2, R3, and R4 directions as illustrated in FIG. 14 is then generated.

Similar to the central optical system 30, as the peripheral measurement charts 34 of the peripheral optical systems 35 are each disposed to be tilted with respect to a plane that is perpendicular to the optical axis 33a of a corresponding one of the peripheral collimator lenses 33, the height of the image formation plane 75 upon which images of the peripheral measurement charts 34 are formed by the taking lens 41 varies with respect to the distance from the optical axis 41a of the taking lens 41 in an orthogonal direction to the optical axis 41a; specifically, the upper image formation plane 75n, the reference image formation plane 75i, and the lower image formation plane 75f. Therefore, the images 91 of the peripheral measurement charts 34 for which the image formation plane 75 of the taking lens 41 varies in height can be obtained in a single image capture, and the peripheral portion through focus graph as illustrated in FIG. 14 can be generated in a single image capture.

The controller 57 converts the line "a" illustrated in FIG. 11 into a line "c" illustrated in FIG. 15(a) using the central portion through focus graph illustrated in FIG. 11 and a relationship between the height of the image formation plane 65 and the distance in the x direction illustrated in FIG. 9(b). The line "c" represents changes in spatial frequency response with respect to a height deviation ΔH between the image formation plane 65 of the taking lens 41 and the image capture plane 53 of the image sensor 52 in the central portion. Also, the controller 57 similarly converts the lines "b1", "b2", "b3", and "b4" illustrated in FIG. 14 into lines "d1", "d2", "d3", and "d4" illustrated in FIG. 15(a). The lines "d1", "d2", "d3", and "d4" represent changes in spatial frequency response with respect to a height deviation ΔH between the image formation plane 75 of the taking lens 41 and the image capture plane 53 of the image sensor 52 in the peripheral portions.

Referring to FIG. 15(a), the spatial frequency response represented by the line "c" has a peak value at the height deviation ΔH1. As ΔH1 is a negative value, it can be determined that the central portion of the image capture plane 53 is lower than the image formation plane 65 of the taking lens 41 by ΔH1, as illustrated in FIG. 15(b). Also, as the spatial frequency responses represented by the lines "d1" and "d3" have a peak value at the height deviation ΔH1, it can be determined that the peripheral portions of the image capture plane 53 in the R1 and R3 directions are lower than the image formation plane 75 of the taking lens 41 by ΔH1. Similarly, as the spatial frequency responses represented by the lines "d2" and "d4" have peaks at height deviations ΔH3 and ΔH2, respectively, it can be determined that the peripheral portions of the image capture plane 53 in the R2 and R4 directions are lower than the image formation plane 75 of the taking lens 41 by ΔH3 and ΔH2, respectively.

In this embodiment, the image formation planes 65 and 75 of the taking lens 41 are flush with each other. As the absolute value of ΔH3>the absolute value of ΔH1>the absolute value of ΔH2 as illustrated in FIG. 15(b), it can be seen that the image capture plane 53 is tilted as illustrated in FIG. 15(b); that is, the central portion of the image capture plane 53 is lower than the image formation planes 65 and 75 of the taking lens 41 by the height ΔH1, and the peripheral portion of the image capture plane 53 in the R2 direction is lower than that in the R4 direction.

The controller 57 causes the six-degree-of-freedom actuator 56 to operate in a manner to slightly raise the image capture plane 53 and remove the tilt between the R2 and R4 directions based on data illustrated in FIGS. 15(a) and 15(b).

When this operation brings the image capture plane 53 to be substantially flush with the image formation planes 65 and 75 of the taking lens 41 as illustrated in FIG. 16(b), all of the lines "c", "d1", "d2", "d3", and "d4" have peak values at positions where the height deviation ΔH is zero, as illustrated in FIG. 16(a).

After, as described above, the image capture plane 53 of the image sensor 52 and the image formation planes 65 and 75 of the taking lens 41 are made substantially flush with each other, while this state is kept, the controller 57 causes an ultraviolet radiation emitting device, which is not illustrated, to emit ultraviolet radiation toward the adhesive to cure the adhesive. The assembly of the camera module 50 is completed by joining together the lens unit 40 and the sensor board 51 in this manner.

As described above, the controller 57 of the camera module manufacturing apparatus 100 according to the illustrated embodiment receives, from the image sensor 52, the image 81 of the central measurement chart 32 and the images 91 of the peripheral measurement charts 34 for which the image formation plane 65 or 75 of the taking lens 41 varies in height, in a single image capture in the form of a central image signal and peripheral image signals, respectively. The central portion through focus graph illustrated in FIG. 11 and the peripheral portion through focus graph illustrated in FIG. 14 are then generated, and curves illustrated in FIG. 15 that represent changes in spatial frequency response with respect to the height deviation ΔH between the image formation plane 65 or 75 of the taking lens 41 and the image capture plane 53 of the image sensor 52 are generated, so that the height and the tilt of the image capture plane 53 can be adjusted. As described above, the camera module manufacturing apparatus 100 according to the illustrated embodiment obtains, in a single image capture, spatial frequency response change characteristics with respect to the height deviation ΔH between the image formation plane 65 or 75 of the taking lens 41 and the image capture plane 53 of the image sensor 52 in the central portion and the peripheral portions of the image sensor 52, so that the adjustments of the lens unit 40 and the sensor board 51 in the height direction and in the tilt direction can be performed simultaneously. With this configuration, the relative position of the lens unit 40 and the sensor board 51 can be adjusted more quickly, and productivity can be further increased.

Also, the camera module manufacturing apparatus 100 according to the illustrated embodiment causes the lens unit 40 to be held at a position where the center position of the entrance pupil 42 of the taking lens 41 coincides with the position of the focal point 31f of the central collimator lens 31 and the positions of the focal points 33f of the peripheral collimator lenses 33, so that the central collimator lens 31 and the taking lens 41 constitute a central measurement chart side telecentric optical system, and each of the peripheral collimator lenses 33 and the taking lens 41 constitute a peripheral measurement chart side telecentric optical system. The central collimator lens 31 and the peripheral collimator lenses 33 are configured to form images of the central measurement chart 32 and the peripheral measurement charts 34 in the central portion and the peripheral portions of the image sensor 52 through the entrance pupil 42 of the taking lens 41. Therefore, while the central measurement chart 32 and the peripheral measurement charts 34 are disposed to be respectively tilted with respect to planes that are perpendicular to the optical axes 31a and 33a, the size of the image 81 of the central measurement chart 32 and the images 91 of the peripheral measurement charts 34 that are formed on the image capture plane 53 of the image sensor 52 remains unchanged. Therefore, as error factors are reduced, accuracy can be improved, and spatial frequency response can be calculated accurately.

Also, according to the illustrated embodiment, the central collimator lens 31 and the four peripheral collimator lenses 33 are attached to the same center unit 20, and the four peripheral measurement charts 34 are attached to the peripheral portions 17 of the base 11 to which the center unit 20 is mounted. As such, the optical unit 10 can be made compact.

Referring to FIG. 9(a), a ratio (A1/A2) between a height difference A1 as measured between the distal end 32f and the proximal end 32n of the central measurement chart 32 along the optical axis 31a of the central collimator lens 31 and a height difference A2 as measured between the upper image formation plane 65n and the lower image formation plane 65f and a ratio between a focal length f1 of the central collimator lens 31 and a focal length f2 of the taking lens 41 have the following relationship (1):

$$A1/A2=(f1/f2)^2 \qquad (1)$$

Similarly, referring to FIG. 12(a), a ratio (B1/B2) between a distance difference B1 as measured between the distal end 34f and the proximal end 34n of the peripheral measurement chart 34 along the optical axis 33a of the peripheral collimator lens 33 and a height difference B2 as measured between the upper image formation plane 75n and the lower image formation plane 75f and a ratio between a focal length g1 of the peripheral collimator lens 33 and a local focal length f3 of the taking lens 41 have the following relationship (2):

$$B1/B2=(g1/f3)^2 \qquad (2)$$

The local focal length f3 herein is, for example, represented by f3=f2/cos(θ), where θ represents an angle of view as measured with respect to the optical axis 41a.

The height differences A2 and B2 as measured between the upper image formation plane 65n or 75n and the lower image formation plane 65f or 75f are ranges within which the height of the sensor board 51 is adjustable. As such, the height differences A2 and B2 are adjusted by varying the angle and the length with respect to a plane that is perpendicular to the optical axis 31a or 33a of the central measurement chart 32 or the peripheral measurement chart 34 based on the focal length f2 and the local focal length f3 of the taking lens 41, and the height adjustable range of the sensor board 51 can be adjusted to suit the taking lens 41.

Also, in the foregoing description, the controller 57 of the camera module manufacturing apparatus 100 according to the illustrated embodiment causes the lens unit 40 to be held at a position where the optical axis 41a of the taking lens 41 is coaxial with the optical axis 31a of the central collimator lens 31, and where the center position of the entrance pupil 42 of the taking lens 41 coincides with the position of the focal point 31f of the central collimator lens 31 and the positions of the focal points 33f of the peripheral collimator lenses 33, but the present invention is not limited to this configuration. Any configurations wherein the positions of the focal points 31f and 33f coincide with the center position of the entrance pupil 42 may be employed. The optical axis 41a of the taking lens 41 may be shifted from and non-coaxial with respect to the optical axis 31a of the central collimator lens 31. Also, the positions of the focal points 31f and 33f do not have to coincide with the center position of the entrance pupil 42 of the taking lens 41, and the lens unit 40 may be held at a position where the position of the focal point 31f of the central collimator lens 31 and the positions of the focal points 33f of the peripheral collimator lenses 33 coincide within the area of the entrance pupil 42.

Also, in the foregoing description, the six-degree-of-freedom actuator 56 of the camera module manufacturing apparatus 100 according to the illustrated embodiment adjusts the position of the stage 55 with respect to six degrees of freedom; that is, in the x direction, in the y direction, in the z direction, about the x axis, about the y axis, and about the z axis, to adjust the relative position of the sensor board 51 with respect to the lens unit 40, but the present invention is not limited to this configuration. Any configurations may be employed wherein the relative position of the lens unit 40 and the sensor board 51 can be adjusted based on a central image signal obtained by converting, using the image sensor 52, an image of the central measurement chart 32 that is formed in a central portion of the image sensor 52 by the central optical system 30 and peripheral image signals obtained by converting, using the image sensor 52, images of the peripheral measurement charts 34 that are respectively formed in different peripheral portions of the image sensor 52 by the plurality of peripheral optical systems 35. The robot arm 45 may be moved with respect to six degrees of freedom to adjust the relative position of the lens unit 40 with respect to the sensor board 51. In this configuration, the robot arm 45 adjusts the relative position of the lens unit 40 with respect to the sensor board 51 by causing the lens unit 40 to be held at a position where the position of the focal point 31f of the central collimator lens 31 and the positions of the focal points 33f of the peripheral collimator lenses 33 coincide within the area of the entrance pupil 42; the positions of the focal points 31f and 33f do not have to coincide with the center position of the entrance pupil 42 of the taking lens 41. Further, the adjustment of the relative position may be suspended when a deviation between the center position of the entrance pupil 42 of the taking lens 41 and the position of the focal point 31f of the central collimator lens 31 and the positions of the focal points 33f of the peripheral collimator lenses 33 is greater than a predetermined threshold value.

In this configuration, the driving mechanism of the robot arm 45 serves as the movement mechanism. Also, the robot arm 45 and the stage 55 may cooperate to move with respect to six degrees of freedom to adjust the relative position of the lens unit 40 and the sensor board 51. In this configuration, the driving mechanism of the robot arm 45 and the six-degree-of-freedom actuator 56 serve as the movement mechanism. As described above, the movement mechanism may be any mechanism that moves one of the robot arm 45 and the stage 55 relative to the other, or both relative to each other.

Also, in performing a camera module manufacturing method for manufacturing the camera module 50 using the camera module manufacturing apparatus 100 according to the illustrated embodiment, bringing the optical unit 10 of the camera module manufacturing apparatus 100 according to the illustrated embodiment into an operable state serves as the preparation step of preparing the optical unit 10. Also, performing an image capture process to obtain the image 81 of the central measurement chart 32 and the four images 91 of the four peripheral measurement charts 34, generating a central portion through focus graph and a peripheral portion through focus graph, generating curves that represent changes in spatial frequency response with respect to the height deviation $\Delta H$ between the image formation plane 65 or 75 of the taking lens 41 and the image capture plane 53 of the image sensor 52, and adjusting the height and the tilt of the image capture plane 53, which are all performed by the controller 57, serve as the position adjustment step of adjusting the relative position of the lens unit 40 and the sensor board 51.

The position adjustment step is performed with the central measurement chart 32 being disposed to be tilted with respect to a plane that is perpendicular to the optical axis 31a of the central collimator lens 31, and with each of the peripheral measurement charts 34 being disposed to be tilted with respect to a plane that is perpendicular to the optical axis 33a of a corresponding one of the peripheral collimator lenses 33.

Figure 17:
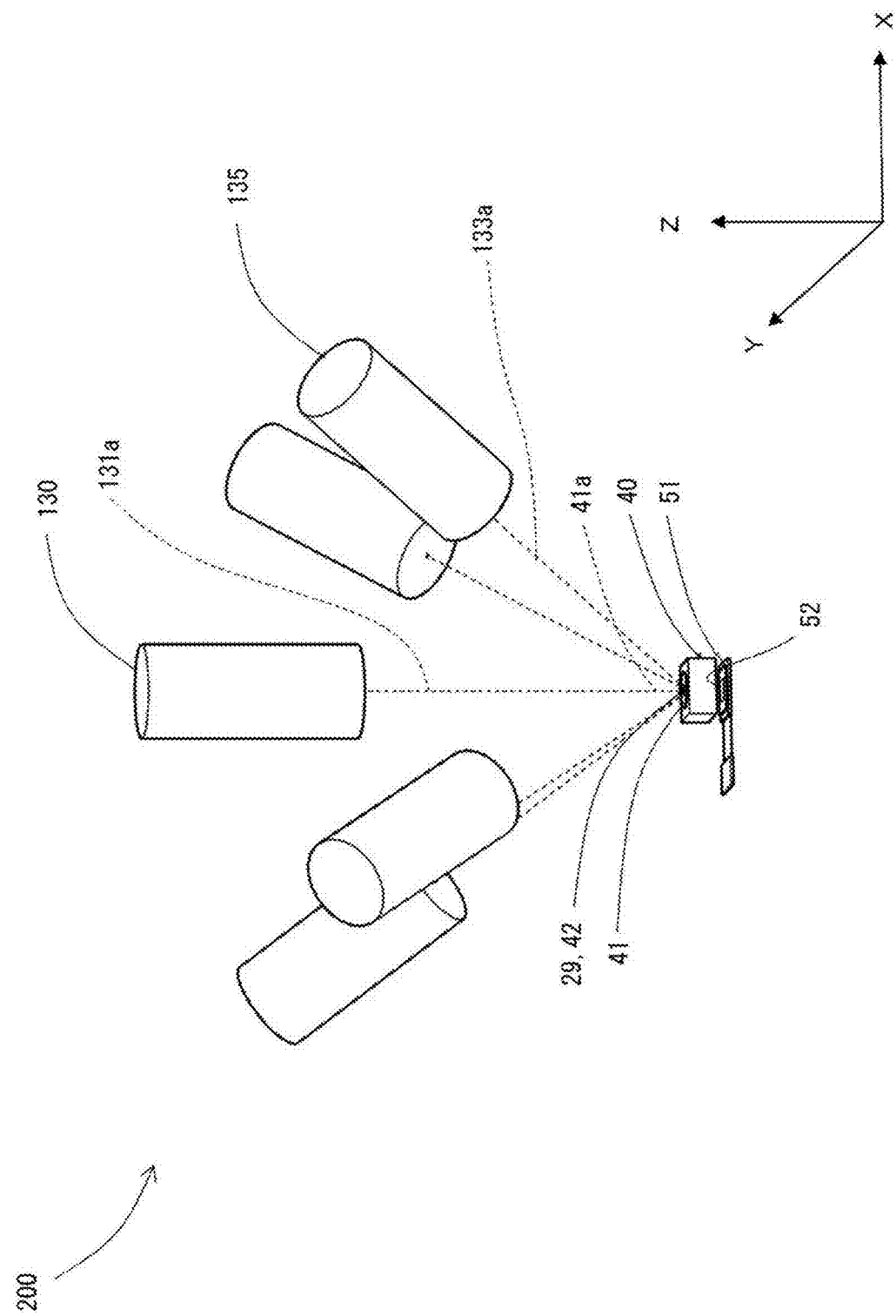
FIG. 17 is a perspective view that illustrates a schematic structure of a camera module manufacturing apparatus according to another embodiment.
Figure 18:
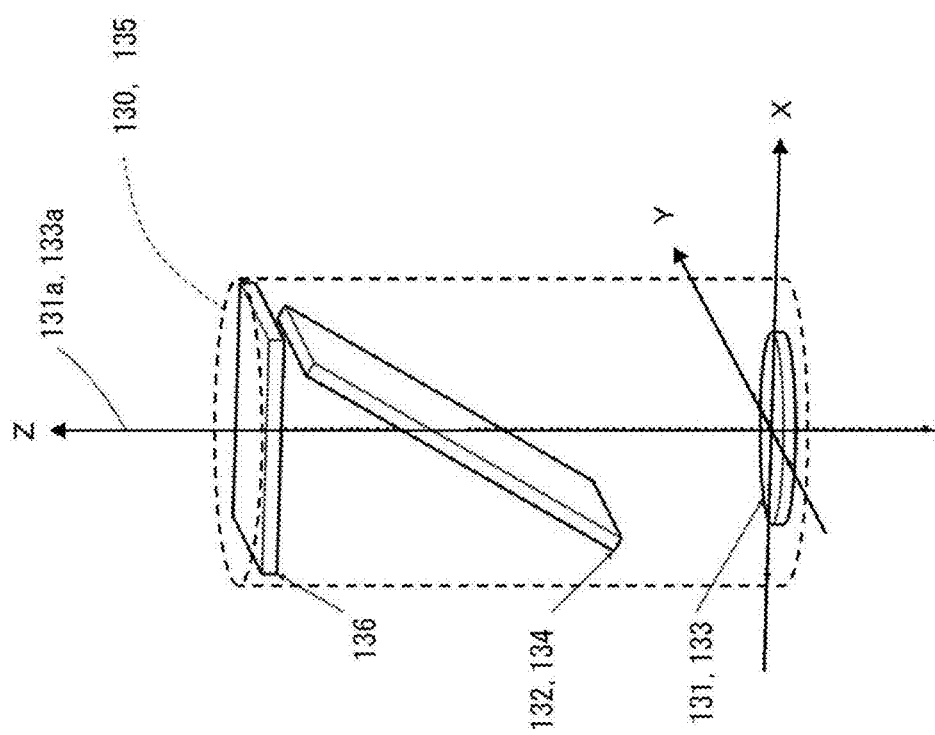
FIG. 18 is a perspective view that illustrates a structure of a central optical unit or a peripheral optical unit that is used in the camera module manufacturing apparatus illustrated in FIG. 17.

Referring next to FIGS. 17 and 18, a camera module manufacturing apparatus 200 according to another embodiment will be described. As illustrated in FIG. 18, the camera module manufacturing apparatus 200 according to the illustrated embodiment includes a central optical unit 130 which includes a light source 136, a central measurement chart 132, and a central collimator lens 131 that are attached in a cylindrical case, and four peripheral optical units 135 each of which includes a peripheral measurement chart 134 and a peripheral collimator lens 133 that are attached in a cylindrical case. The central optical unit 130 is attached to a housing, which is not illustrated, to place the central collimator lens 131 to have its optical axis 131a in a vertical direction. Also, the four peripheral optical units 135 are each attached to the housing to place the peripheral collimator lens 133 to have its optical axis 133a in a direction tilted from the vertical direction such that the optical axes 133a intersect each other at a single point 29 that is located on the optical axis 131a of the central collimator lens 131, and such that the central collimator lens 131 and the peripheral collimator lenses 133 have focal points 131f and 133f that are located at the single point 29.

The robot arm 45, the stage 55, the six-degree-of-freedom actuator 56, and the controller 57 have structures that are similar to those of the camera module manufacturing apparatus 100 described above.

The camera module manufacturing apparatus 200 according to the illustrated embodiment achieves actions and advantages that are similar to those of the camera module manufacturing apparatus 100 described above. Also, as the camera module manufacturing apparatus 200 according to the illustrated embodiment is composed of a combination of a plurality of peripheral optical units 135 and a central optical unit 130, the number of peripheral optical units 135 can be increased or decreased in accordance with required accuracy or processing speed. For example, to seek a reduction in costs, the camera module manufacturing apparatus 200 may be composed of a combination of a central optical unit 130 and two peripheral optical units 135, and to seek an increase in accuracy, the camera module manufacturing apparatus 200 may be composed of, for example, a combination of a central optical unit 130 and eight peripheral optical units 135.

In the embodiments described above, the optical axis 31a or 131a of the central collimator lens 31 or 131 is placed in the vertical direction, but the present invention is not limited to these embodiments; the optical axis 31a or 131a of the central collimator lens 31 or 131 may be placed in a horizontal direction.

The invention claimed is:

1. A camera module manufacturing apparatus for manufacturing a camera module by adjusting a relative position of a lens unit that incorporates a taking lens and a sensor board to which an image sensor configured to convert an image that is formed by the taking lens into an image signal is attached, and for joining together the lens unit and the sensor board with the relative position having been adjusted, the camera module manufacturing apparatus comprising:
   an optical unit including a collimator lens and a measurement chart for forming an image of the measurement chart on the image sensor through the collimator lens and the taking lens,
   wherein the relative position of the lens unit and the sensor board is adjusted based on an image signal obtained by converting, using the image sensor, an image of the measurement chart that is formed on the image sensor by the optical unit, and
   wherein the measurement chart is disposed to be tilted with respect to a plane that is perpendicular to an optical axis of the collimator lens.

2. The camera module manufacturing apparatus according to claim 1, comprising:
   a sensor board holder configured to hold the sensor board;
   a lens unit holder configured to hold the lens unit, the lens unit holder being disposed toward a first side with respect to the sensor board holder;
   a movement mechanism configured to move one of the lens unit holder and the sensor board holder relative to the other or both relative to each other; and
   a controller configured to adjust the relative position of the lens unit and the sensor board using the movement mechanism,
   wherein the optical unit is disposed toward the first side with respect to the lens unit holder,
   wherein the lens unit holder holds the lens unit at a position where a position of a focal point of the collimator lens of the optical unit coincides with a position in an entrance pupil of the taking lens of the lens unit, and
   wherein the collimator lens causes an image of the measurement chart to be formed through the entrance pupil of the taking lens on the image sensor of the sensor board that is held by the sensor board holder.

3. The camera module manufacturing apparatus according to claim 1,
   wherein the optical unit comprises:
      a central optical system including a central collimator lens and a central measurement chart for forming an image of the central measurement chart in a central portion of the image sensor through the central collimator lens and the taking lens; and
      at least two peripheral optical systems each including a peripheral collimator lens and a peripheral measurement chart for respectively forming images of the peripheral measurement charts in peripheral portions of the image sensor through the peripheral collimator lenses and the taking lens,
   wherein the relative position of the lens unit and the sensor board is adjusted based on a central image signal obtained by converting, using the image sensor, an image of the central measurement chart that is formed in the central portion of the image sensor by the central optical system and peripheral image signals obtained by converting, using the image sensor, images of the peripheral measurement charts that are respectively formed in the peripheral portions of the image sensor by the peripheral optical systems,
   wherein the central measurement chart is disposed to be tilted with respect to a plane that is perpendicular to an optical axis of the central collimator lens, and
   wherein the peripheral measurement charts are each disposed to be tilted with respect to a plane that is perpendicular to an optical axis of a corresponding one of the peripheral collimator lenses.

4. The camera module manufacturing apparatus according to claim 3, comprising:
   a sensor board holder configured to hold the sensor board;
   a lens unit holder configured to hold the lens unit, the lens unit holder being disposed toward a first side with respect to the sensor board holder;
   a movement mechanism configured to move one of the lens unit holder and the sensor board holder relative to the other or both relative to each other; and
   a controller configured to adjust the relative position of the lens unit and the sensor board using the movement mechanism,
   wherein the optical unit is disposed toward the first side with respect to the lens unit holder,
   wherein the peripheral collimator lenses are disposed to have the optical axes to be tilted with respect to the optical axis of the central collimator lens and such that positions of focal points of the peripheral collimator lenses and a position of a focal point of the central collimator lens are located at an identical position,
   wherein the lens unit holder holds the lens unit at a position where the position of the focal point of the central collimator lens and the positions of the focal points of the peripheral collimator lenses coincide with a position in an entrance pupil of the taking lens,
   wherein the central collimator lens of the central optical system causes an image of the central measurement chart to be formed through the entrance pupil of the taking lens in the central portion of the image sensor, and
   wherein the peripheral collimator lenses of the peripheral optical systems cause images of the peripheral measurement charts to be respectively formed through the entrance pupil of the taking lens in the peripheral portions of the image sensor.

5. The camera module manufacturing apparatus according to claim 4,
   wherein the lens unit holder holds the lens unit at a position where the taking lens has an optical axis that is coaxial with the optical axis of the central collimator lens, and where a center position of the entrance pupil of the taking lens coincides with the position of the focal point of the central collimator lens and the positions of the focal points of the peripheral collimator lenses.

6. The camera module manufacturing apparatus according to claim 5,
   wherein the optical unit comprises a base that has a flat shape,
   wherein the central collimator lens is attached toward a second side with respect to a central portion of the base to have the optical axis to be perpendicular to a surface of the base, and
   wherein the peripheral collimator lenses are attached toward the second side with respect to peripheral portions of the base to have the optical axes to be tilted with respect to the surface of the base and such that the positions of the focal points of the peripheral collimator lenses and the position of the focal point of the central collimator lens are located at an identical position.

7. The camera module manufacturing apparatus according to claim 6,
   wherein the central measurement chart is disposed toward the first side with respect to the central portion of the base to be tilted with respect to the surface of the base, and
   wherein the peripheral measurement charts are each attached to a corresponding one of the peripheral portions of the base to be parallel with the surface of the base.

8. The camera module manufacturing apparatus according to claim 7,
   wherein the central measurement chart has a center edge that passes through the optical axis of the central collimator lens and extends in a tilt direction, and
   wherein each of the peripheral measurement charts has a first edge that passes through the optical axis of a corresponding one of the peripheral collimator lenses and extends in a direction from the central portion of the base toward a corresponding one of the peripheral portions of the base and a second edge that extends in a direction that intersects the first edge.

9. The camera module manufacturing apparatus according to claim 6, comprising:
   a cover attached toward the first side with respect to the base for covering the first side of the base; and
   a light source attached toward the first side with respect to the base,
   wherein the central measurement chart and the peripheral measurement charts are each composed of a light transmitting portion that transmits light and a light shielding portion that blocks light, and
   wherein an inner surface of the cover reflects light coming from the light source and causes the light to be incident upon the central measurement chart and the peripheral measurement charts.

10. The camera module manufacturing apparatus according to claim 9,
    wherein the light source is shaped like a ring and is disposed to have a central axis that is coaxial with the optical axis of the central collimator lens.

11. The camera module manufacturing apparatus according to claim 4,
    wherein the optical unit comprises a base that has a flat shape,
    wherein the central collimator lens is attached toward a second side with respect to a central portion of the base to have the optical axis to be perpendicular to a surface of the base, and
    wherein the peripheral collimator lenses are attached toward the second side with respect to peripheral portions of the base to have the optical axes to be tilted with respect to the surface of the base and such that the positions of the focal points of the peripheral collimator lenses and the position of the focal point of the central collimator lens are located at an identical position.

12. The camera module manufacturing apparatus according to claim 11,
    wherein the central measurement chart is disposed toward the first side with respect to the central portion of the base to be tilted with respect to the surface of the base, and
    wherein the peripheral measurement charts are each attached to a corresponding one of the peripheral portions of the base to be parallel with the surface of the base.

13. The camera module manufacturing apparatus according to claim 12,
    wherein the central measurement chart has a center edge that passes through the optical axis of the central collimator lens and extends in a tilt direction, and
    wherein each of the peripheral measurement charts has a first edge that passes through the optical axis of a corresponding one of the peripheral collimator lenses and extends in a direction from the central portion of the base toward a corresponding one of the peripheral portions of the base and a second edge that extends in a direction that intersects the first edge.

14. The camera module manufacturing apparatus according to claim 11, comprising:
    a cover attached toward the first side with respect to the base for covering the first side of the base; and
    a light source attached toward the first side with respect to the base,
    wherein the central measurement chart and the peripheral measurement charts are each composed of a light transmitting portion that transmits light and a light shielding portion that blocks light, and
    wherein an inner surface of the cover reflects light coming from the light source and causes the light to be incident upon the central measurement chart and the peripheral measurement charts.

15. The camera module manufacturing apparatus according to claim 14,
    wherein the light source is shaped like a ring and is disposed to have a central axis that is coaxial with the optical axis of the central collimator lens.

16. A camera module manufacturing method for manufacturing a camera module by adjusting a relative position of a lens unit that incorporates a taking lens and a sensor board to which an image sensor configured to convert an image that is foi fined by the taking lens into an image signal is attached, and for joining together the lens unit and the sensor board with the relative position having been adjusted, the camera module manufacturing method comprising:
    a preparation step of preparing an optical unit including a collimator lens and a measurement chart; and a position adjustment step of forming, using the optical unit, an image of the measurement chart on the image sensor through the collimator lens and the taking lens, and adjusting the relative position of the lens unit and the sensor board based on an image signal obtained by converting, using the image sensor, the image of the measurement chart that is formed on the image sensor, wherein the position adjustment step is performed with the measurement chart being disposed to be tilted with respect to a plane that is perpendicular to an optical axis of the collimator lens.

17. The camera module manufacturing method according to claim 16, wherein the optical unit comprises:

a central optical system including a central collimator lens and a central measurement chart for forming an image of the central measurement chart in a central portion of the image sensor through the central collimator lens and the taking lens; and at least two peripheral optical systems each including a peripheral collimator lens and a peripheral measurement chart for respectively forming images of the peripheral measurement charts in peripheral portions of the image sensor through the peripheral collimator lenses and the taking lens, wherein the position adjustment step comprises adjusting the relative position of the lens unit and the sensor board based on a central image signal obtained by converting, using the image sensor, an image of the central measurement chart that is formed in the central portion of the image sensor by the central optical system and peripheral image signals obtained by converting, using the image sensor, images of the peripheral measurement charts that are respectively formed in the peripheral portions of the image sensor by the peripheral optical systems, and wherein the position adjustment step is performed with the central measurement chart being disposed to be tilted with respect to a plane that is perpendicular to an optical axis of the central collimator lens, and with each of the peripheral measurement charts being disposed to be tilted with respect to a plane that is perpendicular to an optical axis of a corresponding one of the peripheral collimator lenses.

* * * * *